United States Patent
Zhang et al.

(10) Patent No.: US 11,742,968 B2
(45) Date of Patent: Aug. 29, 2023

(54) SELF INTERFERENCE MEASUREMENT FOR CLUTTER ECHO DETECTION

(71) Applicant: QUALCOMM Incorporated, San Diego, CA (US)

(72) Inventors: Qian Zhang, Basking Ridge, NJ (US); Navid Abedini, Basking Ridge, NJ (US); Yan Zhou, San Diego, CA (US); Tao Luo, San Diego, CA (US); Junyi Li, Fairless Hills, PA (US); Andrzej Partyka, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/319,969

(22) Filed: May 13, 2021

(65) Prior Publication Data

US 2021/0376941 A1 Dec. 2, 2021

Related U.S. Application Data

(60) Provisional application No. 63/033,736, filed on Jun. 2, 2020.

(51) Int. Cl.
| | | |
|---|---|---|
| *H04B 17/345* | (2015.01) | |
| *H04L 5/14* | (2006.01) | |
| *H04L 5/00* | (2006.01) | |
| *H04W 24/08* | (2009.01) | |

(52) U.S. Cl.
CPC ......... *H04B 17/345* (2015.01); *H04L 5/0048* (2013.01); *H04L 5/14* (2013.01); *H04W 24/08* (2013.01)

(58) Field of Classification Search
CPC .................................................. H04B 17/345
See application file for complete search history.

(56) References Cited

U.S. PATENT DOCUMENTS

| | | | |
|---|---|---|---|
| 2003/0071749 A1* | 4/2003 | Yu | G01S 7/2813 342/107 |
| 2019/0013923 A1* | 1/2019 | Liu | H04B 15/00 |
| 2019/0260485 A1 | 8/2019 | Byun et al. | |
| 2020/0099418 A1* | 3/2020 | Rofougaran | H04B 7/10 |
| 2021/0211893 A1* | 7/2021 | Shao | H04B 7/088 |
| 2021/0344558 A1* | 11/2021 | Lee | H04B 7/0404 |
| 2021/0385057 A1* | 12/2021 | Zhou | H04W 24/10 |
| 2022/0078099 A1* | 3/2022 | Zhohov | H04L 41/14 |

FOREIGN PATENT DOCUMENTS

EP 3567760 A1 11/2019

OTHER PUBLICATIONS

International Search Report and Written Opinion—PCT/US2021/032603—ISA/EPO—Aug. 18, 2021.

* cited by examiner

*Primary Examiner* — Abdeltif Ajid
(74) *Attorney, Agent, or Firm* — Procopio, Cory, Hargreaves & Savitch LLP

(57) ABSTRACT

A configuration to configure a first wireless device to detect clutter echo in order to improve a configuration for SIM. The apparatus receives a SIM configuration having one or more parameters specific to clutter echo detection. The apparatus performs SIM for the clutter echo detection based on the SIM configuration. The apparatus reports one or more beams having a largest self-interference RSRP due to clutter echo.

23 Claims, 19 Drawing Sheets

SELF INTERFERENCE MEASUREMENT FOR CLUTTER ECHO DETECTION

CROSS REFERENCE TO RELATED APPLICATION(S)

This application claims the benefit of U.S. Provisional Application Ser. No. 63/033,736, entitled "Self Interference Measurement for Clutter Echo Detection" and filed on Jun. 2, 2020, which is expressly incorporated by reference herein in its entirety.

TECHNICAL FIELD

The present disclosure relates generally to communication systems, and more particularly, to a self-interference measurement procedure in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus receives a self-interference measurement (SIM) configuration having one or more parameters specific to clutter echo detection that are different than for other types of SIM. The apparatus performs SIM for the clutter echo detection based on the SIM configuration. The apparatus reports one or more beams having a largest self-interference reference signal receive power (RSRP) due to clutter echo.

In an aspect of the disclosure, a method, a computer-readable medium, and an apparatus are provided. The apparatus may be a device at a first wireless device. The device may be a processor and/or a modem at a first wireless device or the first wireless device itself. The apparatus transmits, to a second wireless device, a self-interference measurement (SIM) configuration having one or more parameters specific to clutter echo detection that are different than for other types of SIM. The apparatus receiving a report for one or more beams having a largest self-interference reference signal receive power (RSRP) due to clutter echo.

In an aspect of the disclosure, a method, a computer-readable medium, and an apparatus are provided. The apparatus may be a device at a first wireless device. The device may be a processor and/or a modem at a first wireless device or the first wireless device itself. The apparatus transmits an uplink sounding reference signal (SRS), an uplink demodulation reference signal (DMRS), a physical uplink shared channel (PUSCH), or a physical uplink control channel (PUCCH). The apparatus determines to perform self-interference measurement (SIM) for clutter echo detection. The apparatus performs the SIM for the clutter echo detection based on measurements of the uplink SRS, the uplink DMRS, the PUSCH, or the PUCCH. The apparatus reports one or more beams having a largest self-interference reference signal receive power (RSRP) due to clutter echo.

In an aspect of the disclosure, a method, a computer-readable medium, and an apparatus are provided. The apparatus may be a device at a first wireless device. The device may be a processor and/or a modem at a first wireless device or the first wireless device itself. The apparatus receives a request from a second wireless device for a measurement resource for self-interference measurement (SIM) for clutter echo detection. The apparatus transmits a configuration of the measurement resource to the second wireless device. The apparatus receives a report of one or more beams having a largest self-interference reference signal receive power (RSRP) due to clutter echo.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
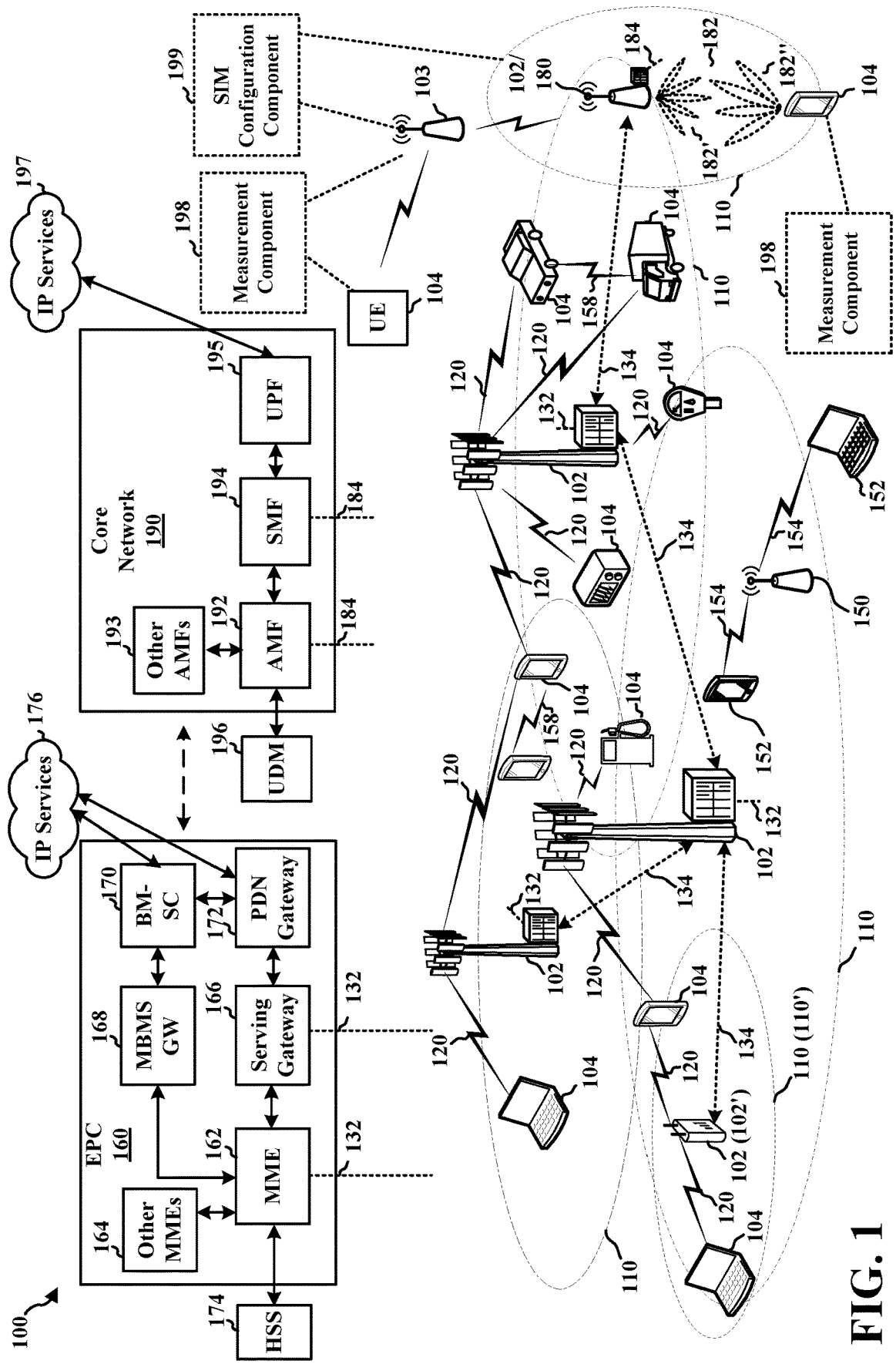
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communication system and access network 100 may include one or more UEs 104 in communication with a base station 102 or 180. The system may include UEs 104 in communication with other UEs 104. The wireless communication system and access network 100 may include an integrated access and backhaul (IAB) network that includes multiple cells in communication with each other to provide an access network and a backhaul network to a core network such as core network 190 or Evolved Packet Core (EPC) 160. The core network 190 may be a 5G Core (5GC) a core network that supports new radio (NR) communication or another type of core network. The IAB network may include one or more IAB nodes 103. The IAB nodes may exchange communication with other IAB nodes 103, with a base station 102 or 180, and/or with UEs 104.

Referring again to FIG. 1, in certain aspects, a wireless device such as the UE 104 or an IAB node 103 may be configured to detect clutter echo in order to improve a configuration for SIM and detect the location of a clutter. The IAB node 103 may be an IAB node, a child node or a parent node. For example, the UE 104 or IAB node 103 may include a measurement component 198 configured to perform a measurement that may indicate a clutter echo in an estimated location. The UE 104 or IAB node may receive a self-interference measurement (SIM) configuration having one or more parameters specific to clutter echo detection that are different than for other types of SIM. For example, the UE 104 may receive the configuration from a base station 102 or 180 or from an IAB node 103. The IAB node 103 may receive the configuration from a parent IAB node or from a base station 102 or 180. The UE 104 or IAB node may perform SIM for the clutter echo detection based on the SIM configuration. The UE 104 or IAB node may report one or more beams having a largest self-interference reference signal receive power (RSRP) due to clutter echo.

Referring again to FIG. 1, in certain aspects, a base station 102 or 180 or an IAB Node 103 may be configured to provide a SIM configuration that accounts for detected clutter echo. For example, base station 102 or 180 or IAB Node 103 may include a SIM configuration component 199 configured to transmit, to the UE 104 or to a child IAB node 103, a SIM configuration having one or more parameters specific to clutter echo detection. The base station 102 or 180 or the IAB Node 103 may transmit, to the UE 104 or child IAB node 103, a SIM configuration having one or more parameters specific to clutter echo detection that are different than for other types of SIM. The base station 102 or 180 or the IAB Node 103 may receive a report for one or more beams having a largest self-interference RSRP due to clutter echo.

Although examples in the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
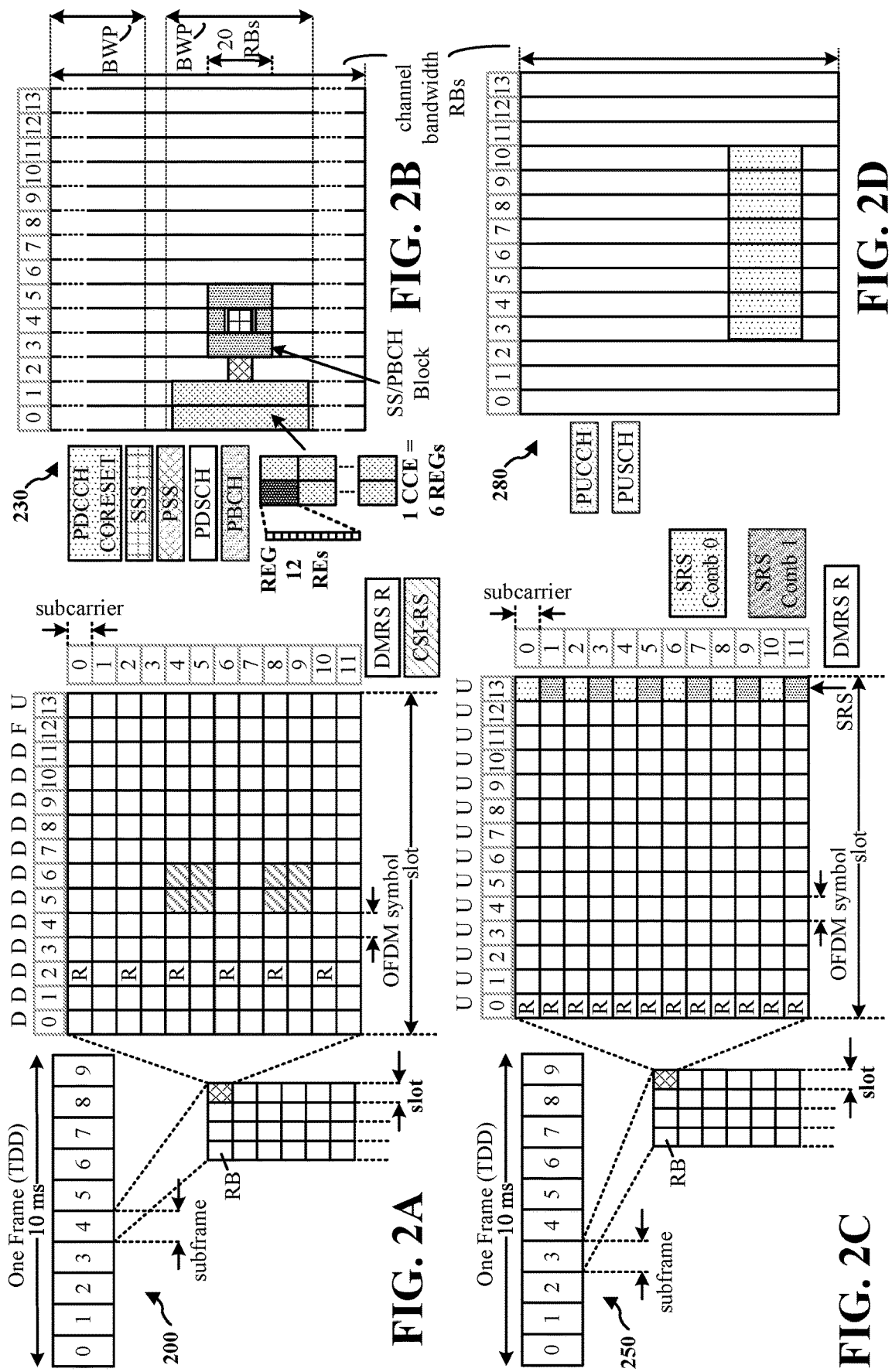
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
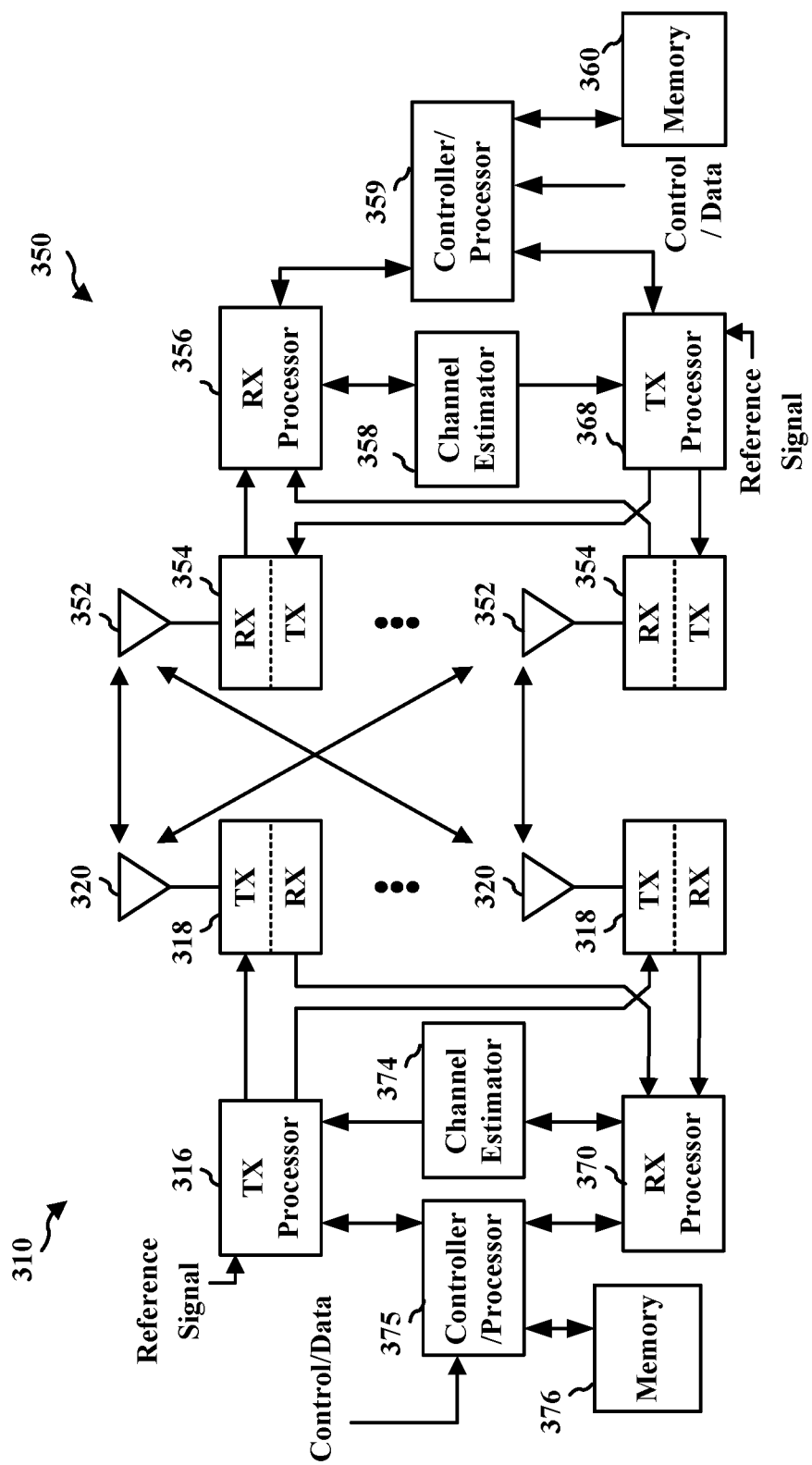
FIG. 3 is a diagram illustrating an example of an IAB node and user equipment (UE) in a network.

FIG. 3 is a block diagram of a wireless device 310 in communication with another wireless device 350 in an access network. In some examples, the wireless device 310 may be a base station in communication with a UE (e.g., the device 350). In other examples, the wireless device 310 or 350 may be an IAB node. For example, the device 310 may be an IAB node and the device 350 may be a child node or a UE. In other examples, the wireless device 310 may be a base station, and the wireless device 350 may be an IAB node. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions are then decoded and deinterleaved to recover the data and control signals that were originally transmitted by the wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the wireless device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement component 198 of FIG. 1.

At least one of the TX processor 316, the RX processor 370, and the controller/processor 375 may be configured to perform aspects in connection with the SIM configuration component 199 of FIG. 1.

Figure 4:
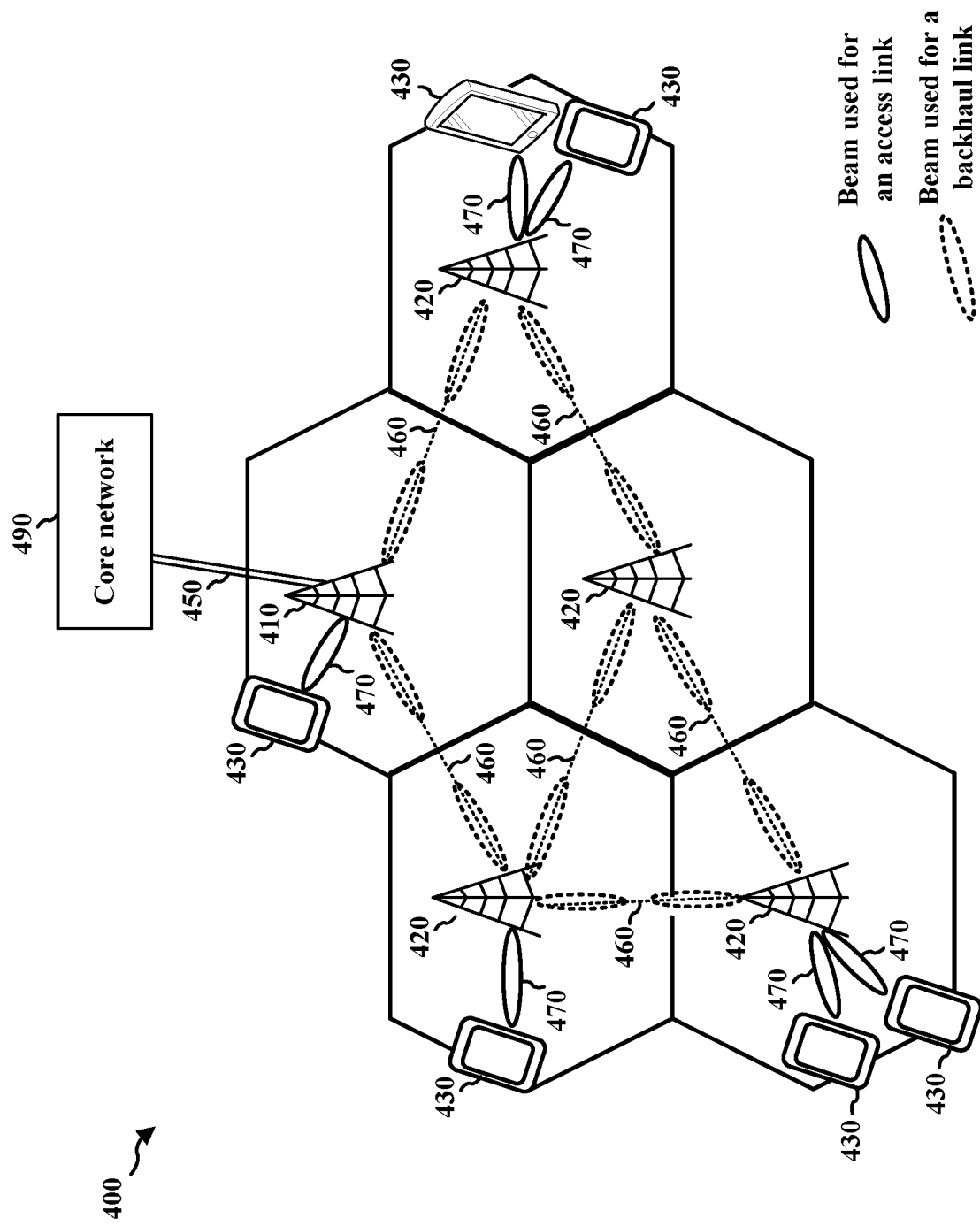
FIG. 4 is a diagram illustrating an example IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
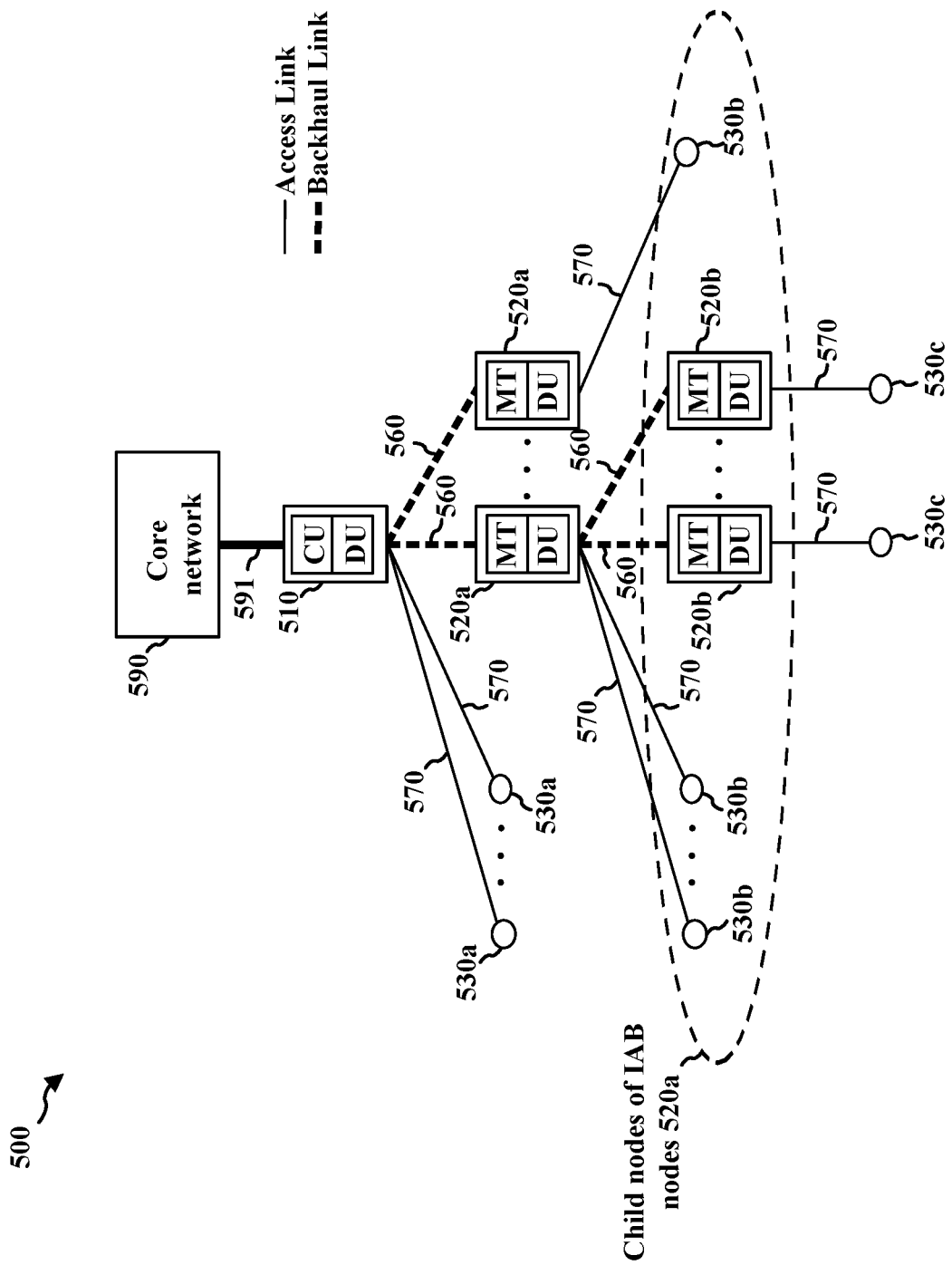
FIG. 5 is a diagram illustrating an example IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530a-c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

A wireless device may transmit and receive communication in a full duplex (FD) mode in which the device transmits and receives communication at overlapping times. Full duplex operation may involve simultaneous uplink and downlink transmissions, for example. Flexible time division duplex (TDD) operation may support full duplex communication. In wireless communication systems that support FD communication, a wireless device may experience self-interference that degrades the communication. Self-interference may occur if a transmitted signal from a transmitting device is leaked to (e.g., received by) the transmitting device's own receive port. The transmitting device may cause interference to its own reception if transmission and reception overlap at least partially in time. In addition, the transmitted signal may be reflected by an object back to the receive port, which may be known as clutter echo. As used herein, a "clutter echo" refers to a signal transmitted by a device that is reflected by an object (referred to herein as a "clutter") and received by the device's own receiver. Reducing self-interference, especially clutter echo, via spatial isolation by properly choosing transmit and receive beams or more advanced transmit/receive beamforming may assist in supporting FD communication. FD communication allows for simultaneous UL and DL transmission in FR2 and different associated aspects of procedures. Flexible TDD capability may be present at either a base station (e.g., gNB) or UE or both. For example, a UE in FD communication may transmit UL from one antenna panel and receive DL in another antenna panel. FD communication may be conditional on UL/DL beam separation. FD communication may result in a reduction of latency, such that it may be possible to receive a DL signal in UL only slots. At least another benefit is that FD communications may provide for a spectrum efficiency enhancement (e.g., per cell or per UE), which may allow for an increase in efficient resource utilization.

The flexible TDD capability, including FD capability, may be a capability of a UE, a base station, an IAB node, a parent node, and/or a child node. For example, a UE may be capable of transmitting uplink transmissions from one antenna panel while performing downlink reception with another antenna panel. In some aspects, the capability may be conditional based on beam separation, the use of different panels, etc.

The flexible TDD capability, and FD mode, may reduce latency for communication by transmitting and receiving at the same time. For example, receiving downlink signals in uplink slots may enable a UE to receive the downlink communication from the base station more quickly and reduce the latency for such communication. The spectrum efficiency may be improved, including improvements per cell and/or per UE. The FD mode may provide more efficient resource utilization.

Self-interference measurements may be performed to determine whether FD capability may be supported or not, or may be enabled/enhanced at a wireless device. To perform self-interference measurements, the wireless device may send a signal from a first set of antennas on one or more transmit beam directions, and may measure the received signal (e.g., reflected back or leaked transmission signal) on a second set of antennas on one or more receive beam directions.

In some instances, a wireless device may receive a configuration to perform self-interference measurements from a network entity. The network entity may provide configurations/resources for the wireless device to perform the self-interference measurement. The network entity may configure the wireless device to provide reports of the self-interference measurements. The network entity, based on the received report of self-interference, may determine the wireless device's FD capability, conditions, and/or performance. However, the network entity may not account for clutter echo in configuring the wireless device to perform self-interference measurements.

In some instances, the wireless device may be configured to perform self-interference measurements without specific instructions from a network entity. For example, a network entity (e.g., a distributed unit (DU)) may send a downlink signal (e.g., SSB/CSI-RS). The wireless device may measure what level of the downlink signal is received, in terms of reference signal received power (RSRP), on its receive port/antennas. In another example, if a UE or a mobile termination (MT) is scheduled to send an uplink signal (e.g., SRS), the UE or MT may perform a self-interference measurement on its receive port/antennas. In some instances, the wireless device may not provide any reporting of the self-interference measurements to another entity (e.g., network). The wireless device may use the self-interference measurement to determine whether it may support FD or for beam tuning. However, the wireless device may not account for clutter echo while performing the self-interference measurement.

Figure 6A:
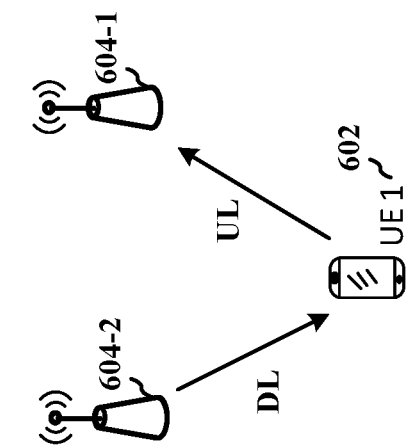
FIGS. 6A-6C are diagrams illustrating examples of full duplex communication.
Figure 6B:
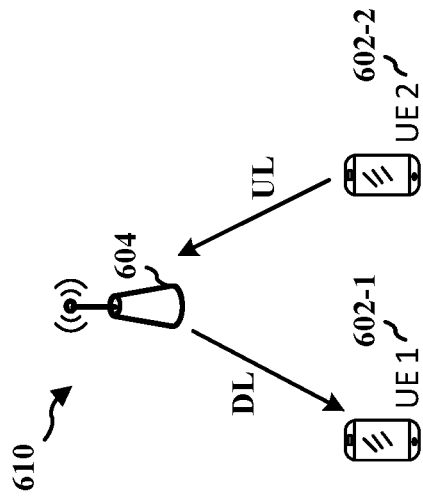
Figure 6C:
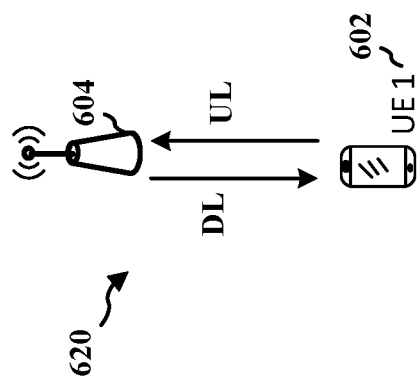

FIGS. 6A-6C are diagrams illustrating examples 600, 610, 620 of full duplex (FD) communication. The example 600 of FIG. 6A includes a UE1 602 and two base station (e.g., TRPs) 604-1, 604-2, wherein the UE1 602 is sending uplink transmissions to base station 604-1 and is receiving downlink transmissions from base station 604-2, e.g., in a simultaneous manner that overlaps in time. In some aspects, 604-1 and 604-2 or 604 may represent IAB nodes. In the example 600 of FIG. 6A, FD is enabled for the UE1 602, but not for the base stations 604-1, 604-2. The example 610 of FIG. 6B includes two UEs, UE1 602-1 and UE2 602-2 and a base station 604, wherein the UE1 602-1 is receiving a downlink transmission from the base station 604 and the UE2 602-2 is transmitting an uplink transmission to the base station 604, e.g., in a simultaneous manner that overlaps in time. In the example 610 of FIG. 6B, FD is enabled for the base station 604, but not for the UEs UE1 602-1 and UE2 602-2. The example 620 of FIG. 6C includes a UE1 602 and a base station 604, wherein the UE1 602 is receiving a downlink transmission from the base station 604 and the UE1 602 is transmitting an uplink transmission to the same base station 604, e.g., in a simultaneous manner that overlaps in time. In the example 620 of FIG. 6C, FD is enabled for both the UE1 602 and the base station 604.

The present disclosure relates to improving the manner in which self-interference measurement may be configured. A self-interference measurement configuration may be adjusted in response to detected clutter echo. For example, a wireless device may be configured to detect clutter echo and may report such results to a network entity, such that the network entity may adjust the self-interference configuration. In another example, a wireless device may be configured to detect clutter echo and may request a self-interference measurement configuration in view of the detected clutter echo. Configuring the self-interference measurement to account for detected clutter echo may assist in performing self-interference measurements. As such, improving the manner in which a self-interference measurement is configured to allow for the detection of clutter echo is desirable.

Beam separation of the transmit and receive beams assist in limiting or reducing self-interference that may occur during FD communication. It is desirable to account for clutter echo when configuring self-interference measurements to minimize self-interference. Determining whether clutter echo is present may allow for the self-interference measurement configuration to be adjusted, which may provide a reliable FD communication by selecting beam pairs that minimize or reduce self-interference.

Figure 7:
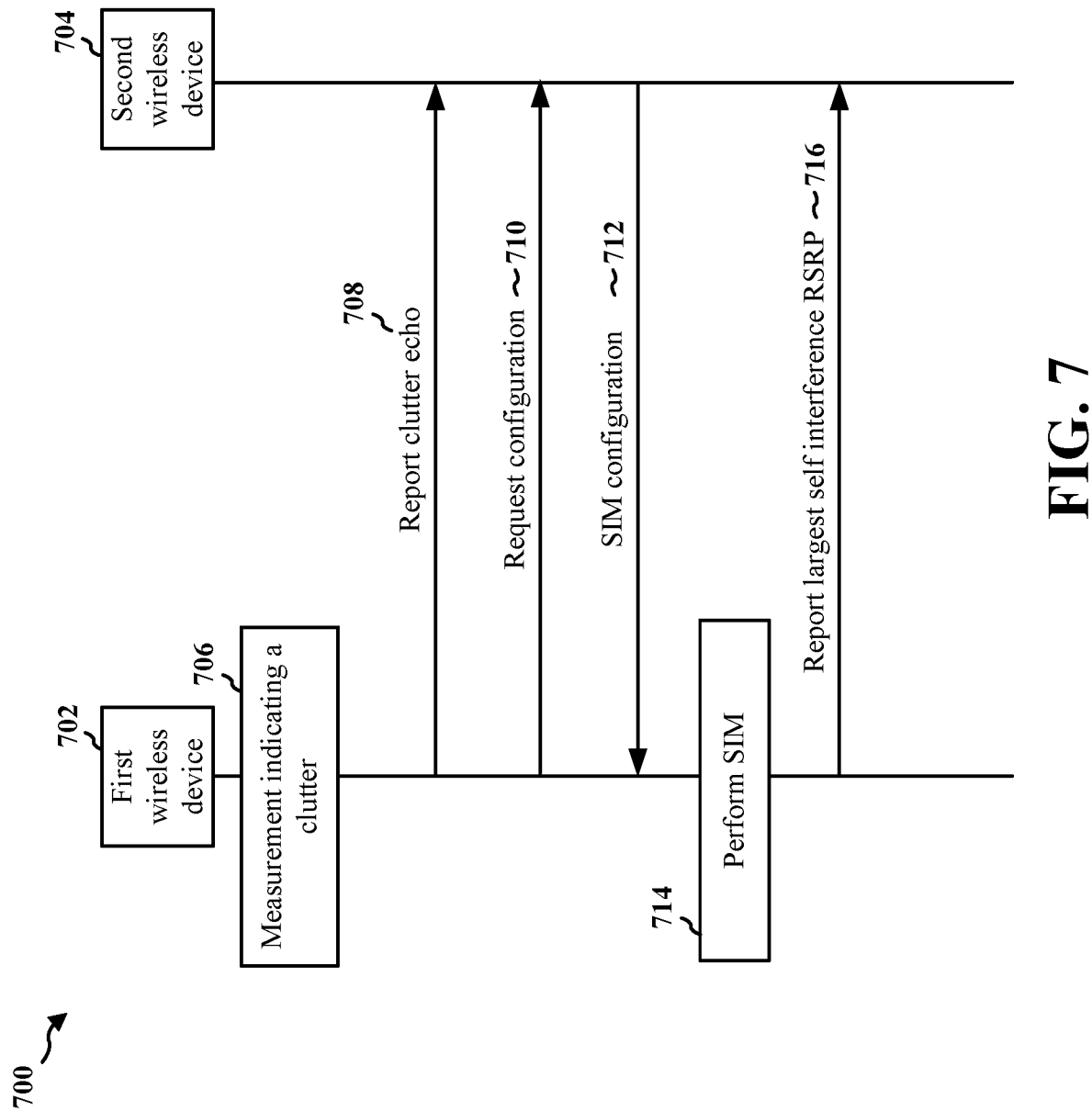
FIG. 7 is a call flow diagram of signaling between a first wireless device and a second wireless device in accordance with certain aspects of the disclosure.

FIG. 7 is a call flow diagram 700 between a first wireless device 702 and a second wireless device 704. In some aspects, the first wireless device 702 may be a UE and the second wireless device 704 may be a base station, where the base station provides a cell serving the UE. In other examples, the first wireless device 702 may be a UE and the second wireless device 704 may be an IAB node. In other examples, the first wireless device may be an IAB node (e.g., a child node) and the second wireless device may be a parent IAB node, a central unit, a donor node, or a base station. For example, in the context of FIG. 1, the second wireless device 704 may correspond to the base station 102/180 or an IAB node 103 and, accordingly, the cell may include a geographic coverage area 110 in which communication coverage is provided and/or small cell 102' having a coverage area 110'. Further, the first wireless device 702 may correspond to a UE 104 or an IAB node 103. In another example, in the context of FIG. 3, the second wireless device 704 may correspond to the device 310, and the first wireless device 702 may correspond to the device 350.

As illustrated in FIG. 7, the first wireless device 702, at 706, may perform a measurement. The measurement may be configured to indicate a clutter echo in an estimated location. The first wireless device 702 may perform the measurement, at 706, prior to receiving a SIM configuration from the second wireless device 704.

The first wireless device 702 may report information about a clutter echo to the second wireless device 704. The first wireless device 702 may report 708 information about the clutter echo to the second wireless device 704 based on a prior measurement (e.g., measurement 706) before receiving a SIM configuration having one or more parameters for clutter echo detection. In some aspects, the information may include reception timing that the first wireless device may report to the second wireless device. The second wireless device 704 receives the report 708 from the first wireless device 702.

In some aspects, the first wireless device 702 may request, at 710, at least one configuration parameter. The at least one configuration parameter may include at least one of an increased transmission power, a timing configuration, one or more beam directions, or an angular offset within the indicated direction range for the clutter echo detection. The second wireless device 704 receives the request for the at least one configuration parameter.

At 712, the second wireless device 704 may transmit a SIM configuration. The SIM configuration may have one or more parameters specific to clutter echo detection that are different than for other types of SIM. In some aspects, the one or more parameters for the clutter echo detection include an increased transmission power. In some aspects, the increased transmission power may be for one or more of an uplink sounding reference signal (SRS), an uplink demodulation reference signal (DM-RS), a physical uplink shared channel (PUSCH), or a physical uplink control channel (PUCCH) based on the increased transmission power.

In some aspects, the one or more parameters for the clutter echo detection includes one or more timing parameters. As the clutter echo may be from a remote reflector, the SIM may include a longer propagation delay than for closer reflectors. The configured timing parameters for the clutter echo detection may help to avoid problems from the longer propagation delay. The one or more timing parameters may include an adjusted transmission timing. In some aspects, the adjusted transmission timing may indicate an offset that may be applied to a timing alignment value sent by the second wireless device to assist with improving the timing alignment. The adjusted transmission timing may provide alignment that avoids leaking from the reflection of the transmitted signal into adjacent symbols, e.g., symbols adjacent to symbols used for SIM. The one or more timing parameters configured for clutter echo detection may include the configuration of a guard period on adjacent symbols to symbols measuring self-interference caused by clutter echo. The guard period may help to avoid reflection of the transmitted signal from affecting transmissions in the following symbols. The one or more timing parameters configured for clutter echo detection may include an increased measurement window. For example, the measurement window may include one or more additional symbols beyond a symbol in which the SIM signal was transmitted. The added one or more symbols may be reserved from use for other data or RS transmission to avoid leakage from the SIM for clutter echo. For example, if five symbols will be used for SIM, the measurement window may include more than five symbols, e.g., 6 or 7 symbols. The increased number of symbols provides a gap or guard period between the symbol in which the signal is transmitted similar to the configuration of a guard period. The one or more timing parameters configured for clutter echo detection may include an indication for the first wireless device to measure and report round trip timing (RTT) information. The RTT information may enable the second wireless device 704 to determine timing adjustments to configure for the first wireless device 702.

In some aspects, the one or more parameters for the clutter echo detection may include additional resources for the SIM for the clutter echo detection. For example, the second wireless device may configure a more exhaustive transmission/reception beam sweep for the first wireless device 702 in order to identify the direction of a clutter echo, e.g., an increased range for the TX and/or RX beam sweep. In some aspects, the increased beam sweeps for the SIM for the clutter echo detection may be relative to normal self interference measurements. For example, in order to detect the directivity of the clutter echo, the second wireless device may configure a higher repetition value to sweep more beams or narrower beams to detect the location of the clutter echo. The additional resources may include one or more of increased TX and/or RX beam sweeps for the SIM for the clutter echo detection, a first indication to use a synchronization signal block (SSB) for the SIM for the clutter echo detection, a second indication to use a channel state information reference signal (CSI-RS) for the SIM for the clutter echo detection, or a third indication to use a sounding reference signal (SRS) transmission for the SIM for the clutter echo detection. For example, the first wireless device 702 may be configured to perform a blind search based on SRS transmission. The one or more parameters may provide an increased opportunity for the first wireless device 702 to detect or identify a clutter echo direction.

In some aspects, the one or more parameters for the clutter echo detection may include a direction range for the clutter echo detection. For example, if the second wireless device has information about a location of a clutter echo, the second wireless device may configure the first wireless device 702 to perform the SIM in a direction associated with the clutter echo, e.g., in a direction based on the location of the clutter echo. The direction range may be indicated based on at least one or more beam directions within an angle range or an angular offset of a beam. The direction may be indicated based on an absolute beam direction within an estimated angle range, for example. Additionally or alternatively, the direction may be indicated based on an absolute or relative angular offset of a particular beam.

In some examples, the first wireless device 702 may have information about the direction or location of a clutter echo. The first wireless device 702 may report the information about the clutter echo to the second wireless device 704. The first wireless device 702 may also request a SIM configuration, e.g., a SIM configuration based on or in response to the information provided by the first wireless device 702. The first wireless device may request a larger transmission power, a timing configuration, one or more beam directions, an angular offset, etc. The first wireless device 702 may also report reception timing to the second wireless device 704 to assist in the configuration of a timing adjustment.

In some aspects, the first wireless device may be a base station and the second wireless device may be a UE. In some aspects, the second wireless device is an IAB node and the first wireless device is a parent IAB node or a child node. The first wireless device 702 receives the SIM configuration, from the second wireless device 704, having the one or more parameters specific to clutter echo detection that are different than for other types of SIM.

At 714, the first wireless device 702 may perform SIM for the clutter echo detection. The first wireless device 702 may perform SIM in response to receiving the SIM configuration 712 from the second wireless device 704. The first wireless device may perform SIM for the clutter echo detection based on the SIM configuration. In some aspects, to perform the SIM for the clutter echo detection, the first wireless device, may transmit one or more of an uplink sounding reference signal, an uplink demodulation reference signal, a physical uplink shared channel, or a physical uplink control channel based on the increased transmission power. In some aspects, the first wireless device performs the SIM for the clutter echo detection in a full-duplex mode.

In some aspects, the first wireless device 702 may receive a configuration of half duplex resources from the second wireless device 704. The first wireless device may perform the SIM for the clutter echo detection using the half-duplex resources. In some aspects, the first wireless device may detect an occurrence of clutter echo. The first wireless device may request a SIM training window in response to detecting the occurrence of the clutter echo. The first wireless device may receive a configuration of the SIM training window from a second wireless device. The first wireless device may perform the SIM for the clutter echo detection during the SIM training window.

In some examples, the second wireless device 704 may configure the first wireless device 702 to report information beams that experience clutter echo or that have a lower quality. Such beams may be considered worse beam directions for the first wireless device 702. For example, the first wireless device 702 may report N beams having a largest SI-RSRP, with N being a configured integer number larger or equal to zero. At 716, the first wireless device 702 may report one or more beams having a largest self-interference RSRP due to clutter echo. In some aspects, the first wireless device may report the one or more beams by indicating a CSI-RS identifier (ID) for each of the one or more beams. For example, the first wireless device 702 may report the beams by indicating a corresponding index or identifier to the second wireless device 704, such as a CSI-RS ID for each of the N beams. The beams may have a 1 to 1 relationship with a CSI-RS ID or other reference signal. The second wireless device 704 receives the report for one or more beams having the largest self-interference RSRP due to clutter echo from the first wireless device 702.

Figure 8:
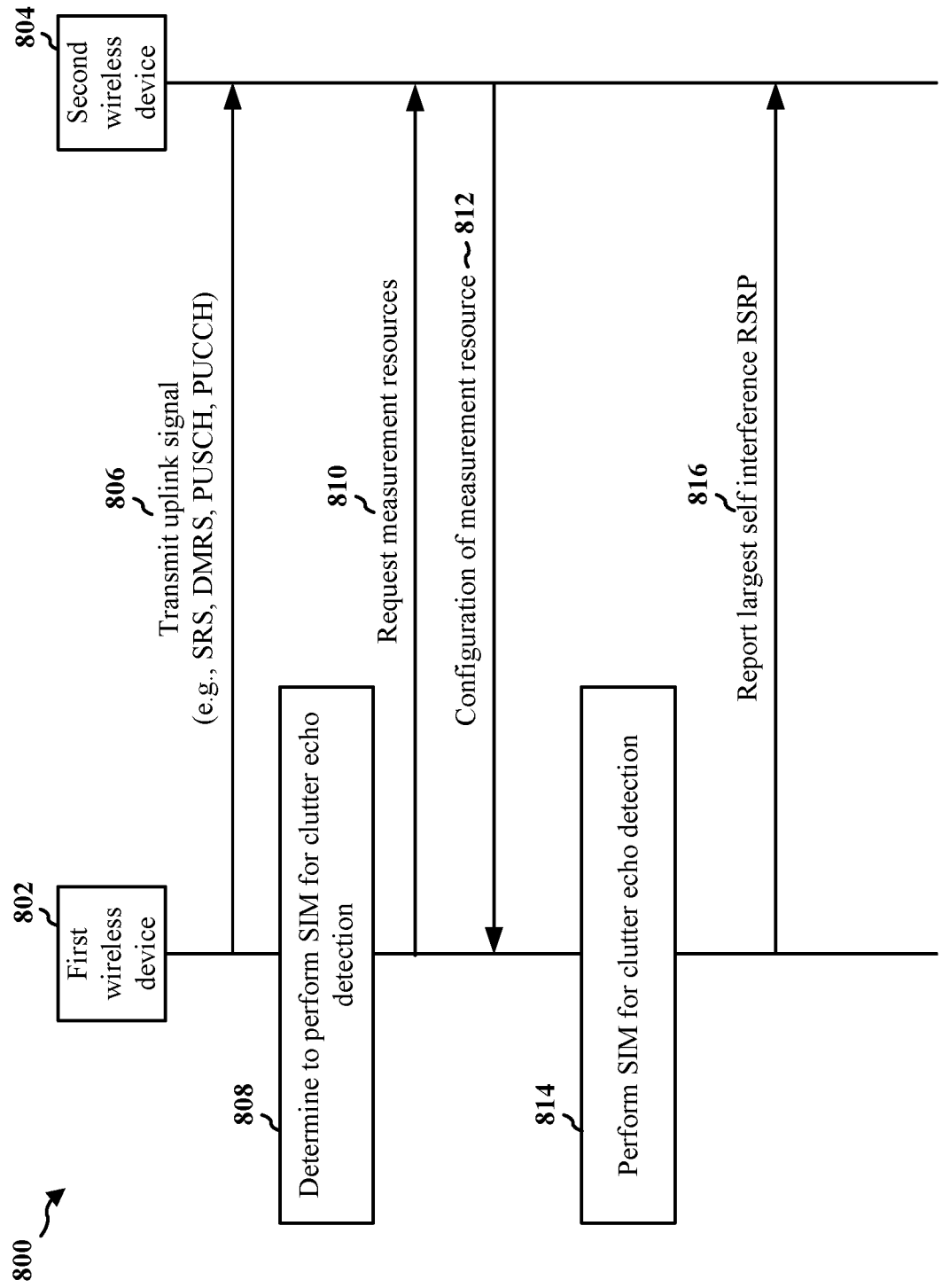
FIG. 8 is a call flow diagram of signaling between a first wireless device and a second wireless device in accordance with certain aspects of the disclosure

FIG. 8 is a call flow diagram 800 between a first wireless device 802 and a second wireless device 804. In some aspects, the first wireless device 802 may be a UE and the second wireless device 804 may be a base station, where the base station provides a cell serving the UE. In other examples, the first wireless device 702 may be a UE and the second wireless device 704 may be an IAB node. In other examples, the first wireless device may be an IAB node (e.g., a child node) and the second wireless device may be a parent IAB node, a central unit, a donor node, or a base station. For example, in the context of FIG. 1, the second wireless device 804 may correspond to the base station 102/180 or IAB node 103 and, accordingly, the cell may include a geographic coverage area 110 in which communication coverage is provided and/or small cell 102' having a coverage area 110'. Further, the first wireless device 802 may correspond to at least UE 104 or IAB node 103. In another example, in the context of FIG. 3, the second wireless device 804 may correspond to the device 310 (e.g., a base station, an IAB node, etc.), and the first wireless device 802 may correspond to the device 350 (e.g., a UE, an IAB node, a child node, etc.).

In contrast to the example in FIG. 7, in FIG. 8, the first wireless device 702 may perform autonomous clutter echo detection or may perform clutter echo detection based on minimal or limited configuration information from the second wireless device 704.

As illustrated in FIG. 8, the first wireless device 802, at 806, may transmit an uplink signal. The uplink signal may comprise an uplink SRS, an uplink DMRS, a PUSCH, or a PUCCH. In some aspects, the first wireless device 802 is a UE. In some aspects, the first wireless device 802 is an IAB node or a child node. The second wireless device 804 receives the uplink signal from the first wireless device 802.

At 808, the first wireless device 802 device may determine to perform SIM for clutter echo detection. The first wireless device may determine to perform the SIM for the clutter echo detection autonomously without instructions from a second wireless device. In some examples, the first wireless device 802 may perform the SIM without a configuration from the second wireless device 804, e.g., without a network configuration. In this example, the network may be transparent to the SIM measurement performed by the first wireless device 802. Alternately, the first wireless device 802 may perform the SIM in an independent manner and based on minimum or limited network configuration for clutter echo detection, such as an echo detection window or a resource for clutter echo reporting.

In some aspects, the first wireless device 802, at 810, may request measurement resources. The first wireless device may request the measurement resources from the second wireless device. The second wireless device 804 may receive a request from the first wireless device 802 for a measurement resource for SIM for clutter echo detection. In some aspects, the measurement resource may include a SIM window. In some aspects, the measurement resource may include a half duplex resource.

In some aspects, the second wireless device 804, at 812, may transmit a configuration of the measurement resource. The second wireless device 804 may transmit the configuration of the measurement resource to the first wireless device 802. In some aspects, the first wireless device 802 may receive the configuration of the window from the second wireless device 804. When the first wireless device 802 determines to perform the SIM, the first wireless device 802 may perform the SIM based on the configured window. Additionally or alternatively, when the first wireless device 802 determines to perform the SIM, the first wireless device 802 may report the SIM to the second wireless device 804 in the configured reporting resource.

The configuration from the second wireless device 804 may come in response to the request from the first wireless device 802, in some examples. In other examples, the second wireless device 804 may determine whether or when to provide the configuration of measurement or reporting resources to the first wireless device 802.

In some examples, the configuration may include periodic SRS for transmission beam sweeping by the first wireless device 802. The first wireless device 802 may use the SRS to perform the SIM.

The first wireless device 802 may detect an occurrence of clutter echo. The first wireless device 802 may request a SIM training window from the second wireless device 804. The first wireless device may request the SIM training window in response to detecting the occurrence of the clutter echo. The second wireless device 804 may transmit a configuration of the SIM training window, in response to the request from the first wireless device 802. The first wireless device 802 may receive a configuration of the SIM training window from a second wireless device 804. The first wireless device 802 may perform the SIM for the clutter echo detection during the SIM training window.

At 814, the first wireless device 802 may perform the SIM for the clutter echo detection. The first wireless device 802 may perform the SIM for the clutter echo based on measurements of the uplink SRS, the uplink DMRS, the PUSCH, or the PUCCH. In some aspects, the first wireless device 802 may perform the SIM for the clutter echo detection within a window received in a configuration from a second wireless device. In some aspects, the first wireless device 802 may perform the SIM for the clutter echo detection in a half-duplex mode. In some aspects, the first wireless device may perform the SIM for the clutter echo detection in a full-duplex mode.

In some aspects, the first wireless device 802 may request a reporting resource for clutter echo detection. The first wireless device 802 may request the reporting resource for clutter echo detection from the second wireless device 804. In some aspects, the first wireless device 802 may receive a configuration of the reporting resource. The first wireless device 802 may receive a configuration of the reporting resource from the second wireless device 804.

At 816, the first wireless device 802 may report one or more beams having a largest self-interference RSRP due to clutter echo. Similar to the example in FIG. 7, the first wireless device 802 may report a set of N beams having the highest level of SI-RSRP. The first wireless device 802 may report the one or more beams to the second wireless device 804 in the reporting resource indicated by the second wireless device 804. The second wireless device 804 receives the report of the one or more beams having the largest self-interference RSRP due to clutter echo.

In some aspects, the first wireless device 702 or 802 may receive a configuration of half duplex resources from the second wireless device 704 or 804. The first wireless device 702 or 802 may perform the SIM for the clutter echo detection using the half-duplex resources, e.g., before indicating its full-duplex capability to the second wireless device 704 or 804. The first wireless device 702 or 802 may report the SIM to the second wireless device 704 or 804 and may indicate a full-duplex capability. Then, the second wireless device 704 or 804 may configure the first wireless device 702 or 802 for full-duplex communication.

In some aspects, the first wireless device may be configured to perform SIM for clutter echo detection in a full-duplex mode. The second wireless device 704 or 804 may schedule downlink communication to avoid a SIM measurement window of the first wireless device 702 or 804. In some examples, a network may configure half-duplex slots for a UE or an IAB node. The UE or IAB node may use the half-duplex slots to perform SIM for clutter echo detection. In other examples, the UE or IAB node may detect an occurrence of a trigger event (e.g., clutter echo) and in response may request a SIM training window for clutter echo detection.

Figure 9:
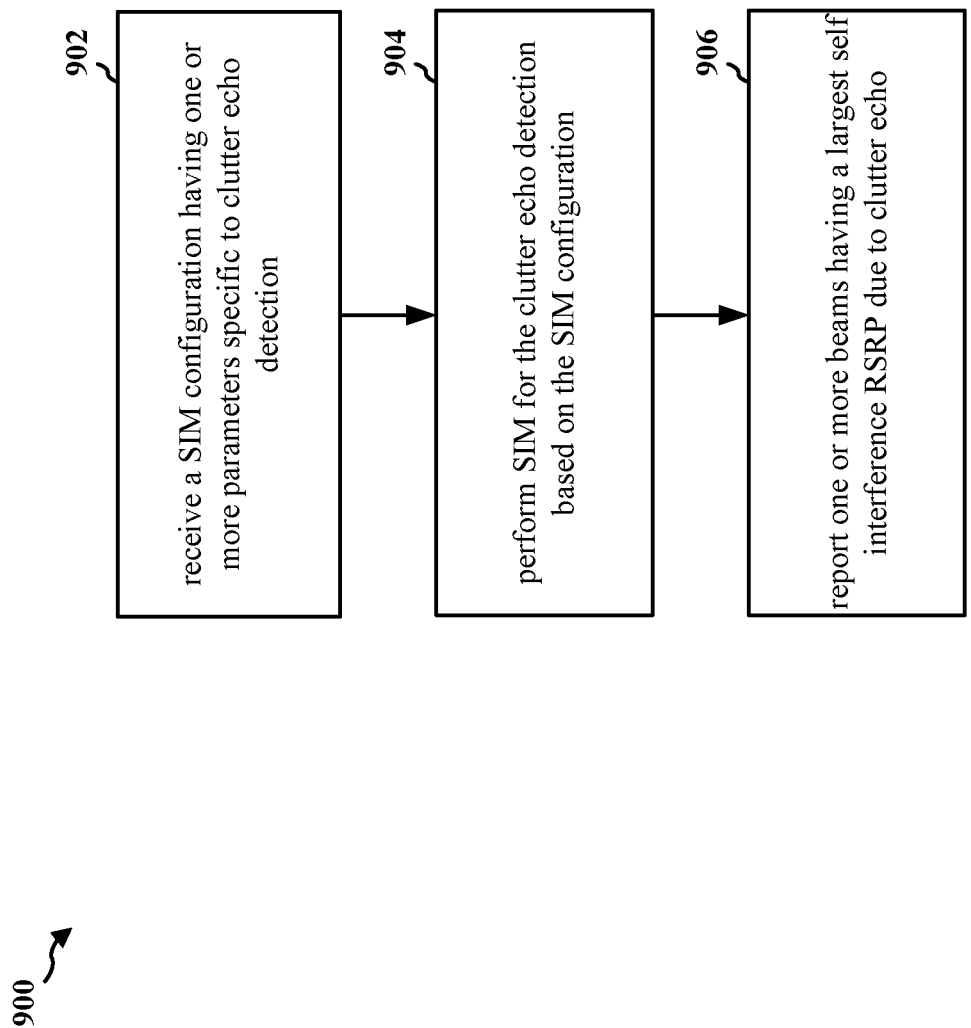
FIG. 9 is a flowchart of a method of wireless communication.

FIG. 9 is a flowchart 900 of a method of wireless communication at a first wireless device. The method may be performed by an IAB node or a UE or a component of an IAB node or a UE (e.g., e.g., the IAB node 103, 410, 420, 510, 520a, 520b; the device 350 702, 704, 802, 804; the UE 104, 430, 602; the apparatus 1102; the cellular baseband processor 1104, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to detect clutter echo.

At 902, the first wireless device may receive a SIM configuration. For example, 902 may be performed by SIM configuration component 1146 of apparatus 1102. The SIM configuration may have one or more parameters specific to clutter echo detection that are different than for other types of SIM. An example of another type of SIM, that is different than SIM based on clutter echo, is SIM due to a transmitted signal that is received directly at the device's receiver (e.g., without being reflected by a clutter/object). In some aspects, the one or more parameters for the clutter echo detection may include an increased transmission power. In some aspects, the one or more parameters for the clutter echo detection includes one or more timing parameters. The one or more timing parameters may include at least one of an adjusted transmission timing, a guard period on adjacent symbols to the symbols measuring self-interference caused by clutter echo, an increased measurement window, or an indication for the first wireless device to measure and report RTT information. In some aspects, the adjusted transmission timing may indicate an offset that may be applied to a timing alignment value sent by a second wireless device (e.g., network entity) to assist with improving the timing alignment. In some aspects, the one or more parameters for the clutter echo detection includes additional resources for the SIM for the clutter echo detection. The additional resources may include one or more of increased beam sweeps for the SIM for the clutter echo detection, a first indication to use a synchronization signal block (SSB) for the SIM for the clutter echo detection, a second indication to use a channel state information reference signal (CSI-RS) for the SIM for the clutter echo detection, or a third indication to use a sounding reference signal (SRS) for the SIM for the clutter echo detection. In some aspects, the increased beam sweeps for the SIM for the clutter echo detection may be relative to normal self interference measurements. For example, in order to detect the directivity of the clutter echo, a second wireless device may configure a higher repetition value to sweep more beams or narrower beams to detect the location of the clutter echo. In some aspects, the one or more parameters for the clutter echo detection includes a direction range for the clutter echo detection. The direction range may be indicated based on at least one beam direction within an angle range or an angular offset of a beam. In some aspects, the first wireless device is a UE. In some aspects, the first wireless device is an IAB node or a child node.

At 904, the first wireless device may perform SIM for the clutter echo detection. For example, 904 may be performed by SIM component 1148 of apparatus 1102. The first wireless device may perform SIM for the clutter echo detection based on the SIM configuration. In some aspects, to perform the SIM for the clutter echo detection, the first wireless device, may transmit one or more of an uplink sounding reference signal, an uplink demodulation reference signal, a physical uplink shared channel, or a physical uplink control channel based on the increased transmission power. In some aspects, the first wireless device performs the SIM for the clutter echo detection in a full-duplex mode.

At 906, the first wireless device may report one or more beams having a largest self-interference RSRP due to clutter echo. For example, 906 may be performed by self-interference component 1158 of apparatus 1102. In some aspects, the first wireless device may report the one or more beams by indicating a CSI-RS ID for each of the one or more beams.

Figure 10:
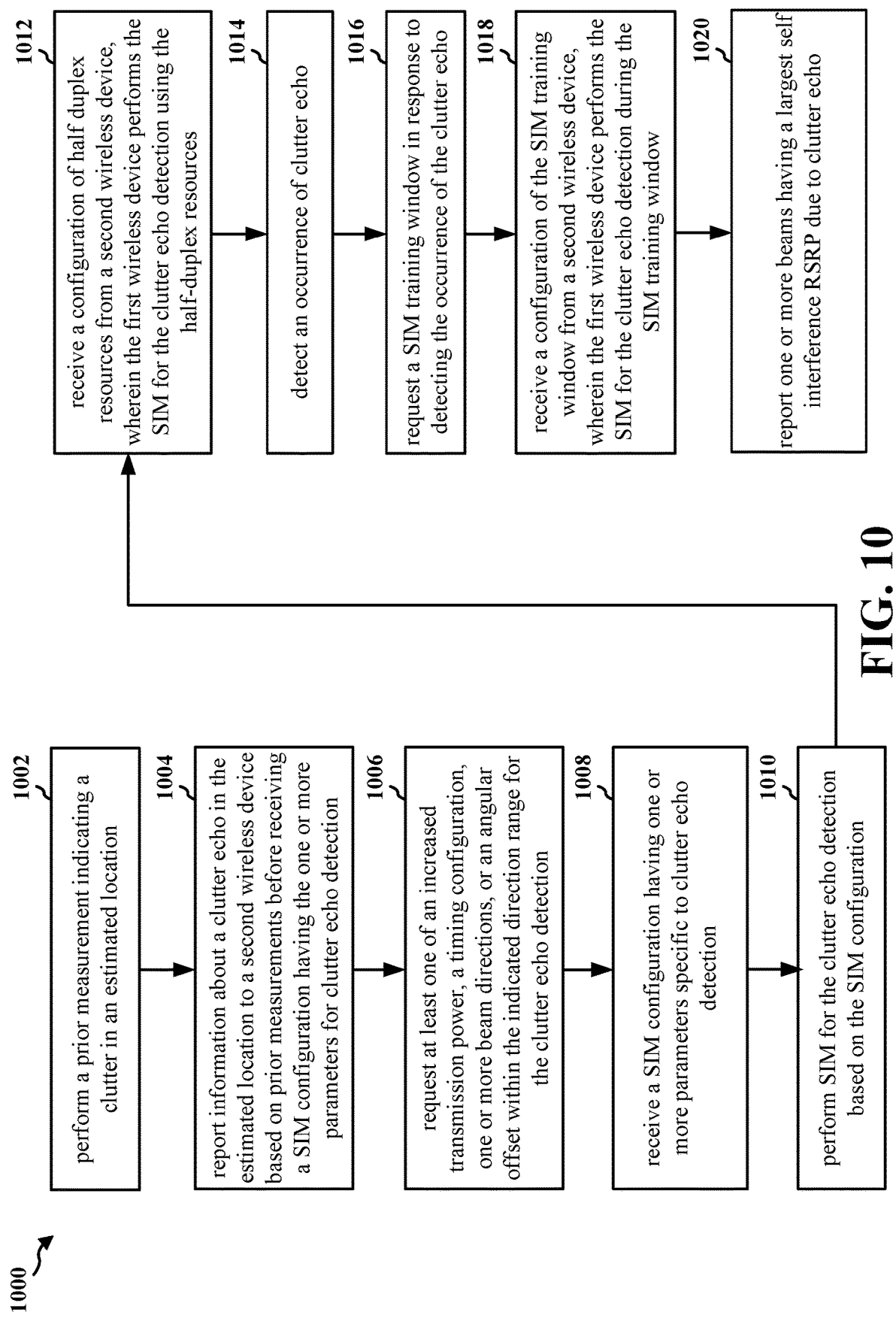
FIG. 10 is a flowchart of a method of wireless communication.

FIG. 10 is a flowchart 1000 of a method of wireless communication at a first wireless device. The method may be performed by an IAB node or a UE or a component of an IAB node or a UE (e.g., e.g., the IAB node 103, 410, 420, 510, 520a, 520b, 604, 704, 804; the device 350 702, 802; the UE 104, 430, 602; the apparatus 1102; the cellular baseband processor 1104, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to detect clutter echo.

At 1002, the first wireless device may perform a measurement. For example, 1002 may be performed by measurement component 1140 of apparatus 1102. The measurement may indicate a clutter echo in an estimated location.

At 1004, the first wireless device may report information about a clutter echo. For example, 1004 may be performed by report component 1142 of apparatus 1102. The first wireless device may report the information about the clutter echo to a second wireless device. The first wireless device may report information about the clutter echo to the second wireless device based on a prior measurement. In some aspects, the first wireless device may report the information about the clutter echo to the second wireless device before receiving a SIM configuration having one or more parameters for clutter echo detection. In some aspects, the information may include reception timing that the first wireless device may report to the second wireless device.

At 1006, the first wireless device may request at least one configuration parameter. For example, 1006 may be performed by request component 1144 of apparatus 1102. The at least one configuration parameter, requested by the first wireless device, may include at least one of an increased transmission power, a timing configuration, one or more beam directions, or an angular offset within the indicated direction range for the clutter echo detection.

At 1008, the first wireless device may receive a SIM configuration. For example, 1008 may be performed by SIM configuration component 1146 of apparatus 1102. The SIM configuration may have one or more parameters specific to clutter echo detection that are different than for other types of SIM. In some aspects, the one or more parameters for the clutter echo detection may include an increased transmission power. In some aspects, the one or more parameters for the clutter echo detection includes one or more timing parameters. The one or more timing parameters may include at least one of an adjusted transmission timing, a guard period on adjacent symbols to the symbols measuring self-interference caused by clutter echo, an increased measurement window, or an indication for the first wireless device to measure and report RTT information. In some aspects, the adjusted transmission timing may indicate an offset that may be applied to a timing alignment value sent by a second wireless device to assist with improving the timing alignment. In some aspects, the one or more parameters for the clutter echo detection may include additional resources for the SIM for the clutter echo detection. The additional resources may include one or more of increased beam sweeps for the SIM for the clutter echo detection, a first indication to use a synchronization signal block (SSB) for the SIM for the clutter echo detection, a second indication to use a channel state information reference signal (CSI-RS) for the SIM for the clutter echo detection, or a third indication to use a sounding reference signal (SRS) for the SIM for the clutter echo detection. In some aspects, the increased beam sweeps for the SIM for the clutter echo detection may be relative to normal self interference measurements. For example, in order to detect the directivity of the clutter echo, the second wireless device may configure a higher repetition value to sweep more beams or narrower beams to detect the location of the clutter echo. In some aspects, the one or more parameters for the clutter echo detection may include a direction range for the clutter echo detection. The direction range may be indicated based on at least one beam direction within an angle range or an angular offset of a beam. In some aspects, the first wireless device may comprise a UE. In some aspects, the first wireless device may comprise an IAB node or a child node.

At 1010, the first wireless device may perform SIM for the clutter echo detection. For example, 1010 may be performed by SIM component 1148 of apparatus 1102. The first wireless device may perform SIM for the clutter echo detection based on the SIM configuration. In some aspects, to perform the SIM for the clutter echo detection, the first wireless device, may transmit one or more of an uplink sounding reference signal, an uplink demodulation reference signal, a physical uplink shared channel, or a physical uplink control channel based on the increased transmission power. In some aspects, the first wireless device performs the SIM for the clutter echo detection in a full-duplex mode.

At 1012, the first wireless device may receive a configuration of half duplex resources. For example, 1012 may be performed by duplex component 1150 of apparatus 1102. The first wireless device may receive the configuration of the half duplex resources from a second wireless device. In some aspects, the first wireless device may perform the SIM for the clutter echo detection using the half-duplex resources.

At 1014, the first wireless device may detect an occurrence of clutter echo. For example, 1014 may be performed by detection component 1152 of apparatus 1102. In some aspects, the detection of the occurrence of the clutter echo may be based on a configuration for clutter echo detection configured by the network. In some aspects, the detection of the occurrence of the clutter echo may be based on a configuration for autonomous clutter echo detection of the first wireless device.

At 1016, the first wireless device may request a SIM training window. For example, 1016 may be performed by window component 1154 of apparatus 1102. The first wireless device my request the SIM training window from the second wireless device. In some aspects, the first wireless device may request the SIM training window in response to detection of the occurrence of the clutter echo.

At 1018, the first wireless device may receive a configuration of the SIM training window. For example, 1018 may be performed by configuration component 1156 of apparatus 1102. The first wireless device may receive the configuration of the SIM training window from a second wireless device. The first wireless device may perform the SIM for the clutter echo detection during the SIM training window.

At 1020, the first wireless device may report one or more beams having a largest self-interference RSRP due to clutter echo. For example, 1020 may be performed by self-interference component 1158 of apparatus 1102. In some aspects, the first wireless device may report the one or more beams by indicating a CSI-RS ID for each of the one or more beams.

Figure 11:
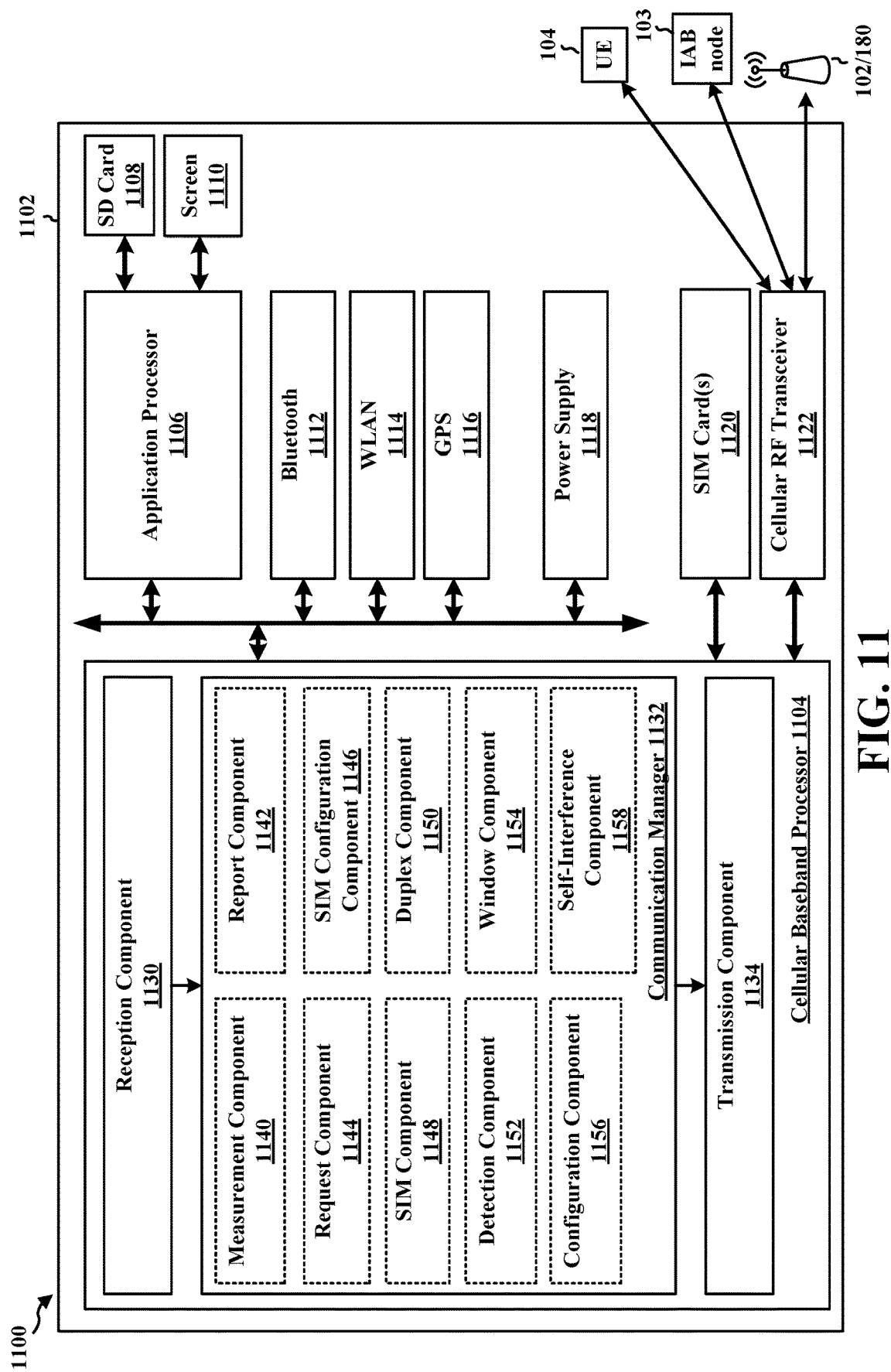
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a measurement component 1140 that is configured to perform a prior measurement that may indicate a clutter echo in an estimated location, e.g., as described in connection with 1002 of FIG. 10. The communication manager 1132 further includes a report component 1142 that is configured to report information about a clutter echo to a second wireless device, e.g., as described in connection with 1004 of FIG. 10. The communication manager 1132 further includes a request component 1144 that is configured to request at least one of an increased transmission power, a timing configuration, one or more beam directions, or an angular offset within the indicated direction range for the clutter echo detection, e.g., as described in connection with 1006 of FIG. 10. The communication manager 1132 further includes a SIM configuration component 1146 that is configured to receive a SIM configuration having one or more parameters specific to clutter echo detection, e.g., as described in connection with 902 of FIG. 9 or 1008 of FIG. 10. The communication manager 1132 further includes a SIM component 1148 that is configured to perform SIM for the clutter echo detection based on the SIM configuration, e.g., as described in connection with 904 of FIG. 9 or 1010 of FIG. 10. The communication manager 1132 further includes a duplex component 1150 that is configured to receive a configuration of half duplex resources, e.g., as described in connection with 1012 of FIG. 10. The communication manager 1132 further includes a detection component 1152 that is configured to detect an occurrence of clutter echo, e.g., as described in connection with 1014 of FIG. 10. The communication manager 1132 further includes a window component 1154 that is configured to request a SIM training window in response to detecting the occurrence of the clutter echo, e.g., as described in connection with 1016 of FIG. 10. The communication manager 1132 further includes a configuration component 1156 that is configured to receive a configuration of the SIM training window, e.g., as described in connection with 1018 of FIG. 10. The communication manager 1132 further includes a self-interference component 1158 that is configured to report one or more beams having a largest self-interference RSRP due to clutter echo, e.g., as described in connection with 906 of FIG. 9 or 1020 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving a SIM configuration having one or more parameters specific to clutter echo detection that are different than for other types of SIM. The apparatus includes means for performing SIM for the clutter echo detection based on the SIM configuration. The apparatus includes means for reporting one or more beams having a largest self-interference RSRP due to clutter echo. The apparatus further includes means for performing a prior measurement indicating a clutter echo in an estimated location. The apparatus further includes means for reporting information about a clutter echo to a second wireless device based on the prior measurement before receiving the SIM configuration having the one or more parameters for clutter echo detection. The apparatus further includes means for requesting at least one of an increased transmission power, a timing configuration, one or more beam directions, or an angular offset within the indicated direction range for the clutter echo detection. The apparatus further includes means for receiving a configuration of half duplex resources from a second wireless device, wherein the first wireless device performs the SIM for the clutter echo detection using the half-duplex resources. The apparatus further includes means for detecting an occurrence of clutter echo. The apparatus further includes means for requesting a SIM training window in response to detecting the occurrence of the clutter echo. The apparatus further includes means for receiving a configuration of the SIM training window from a second wireless device, wherein the first wireless device performs the SIM for the clutter echo detection during the SIM training window. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
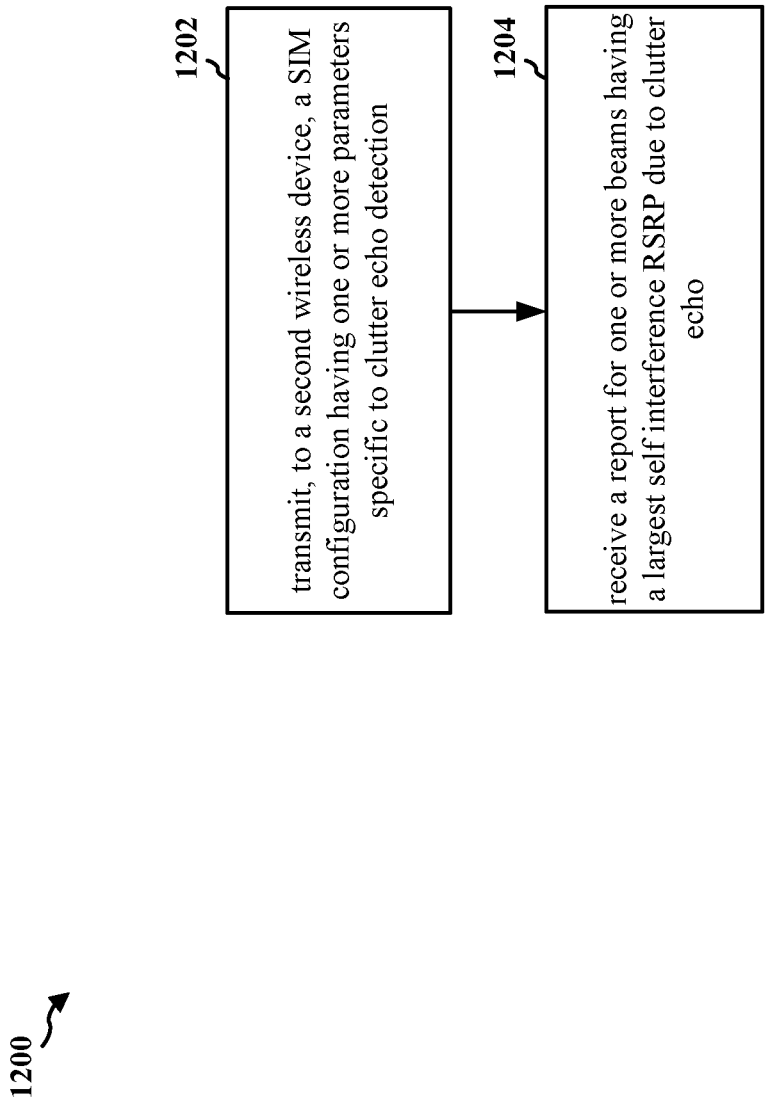
FIG. 12 is a flowchart of a method of wireless communication.

FIG. 12 is a flowchart 1200 of a method of wireless communication at a first wireless device. The method may be performed by an IAB node or a base station or a component of an IAB node or a base station (e.g., the IAB node 103, 410, 420, 510, 520a, 520b; the base station 604, 604-1, 604-2; the device 310, 704, 804; the base station 102, 180; the apparatus 1402; the baseband unit 1404, which may include the memory 376 and which may be the entire wireless device 310 or a component of the wireless device 310, such as the TX processor 316, the RX processor 370, and/or the controller/processor 375). One or more of the illustrated operations may be optional, omitted, transposed, or contemporaneous. The method may enable a first wireless device to detect clutter echo.

At 1202, the first wireless device may transmit a SIM configuration. For example, 1202 may be performed by SIM configuration component 1444 of apparatus 1402. The first wireless device may transmit the SIM configuration to a second wireless device. The SIM configuration may have one or more parameters specific to clutter echo detection that are different than for other types of SIM. In some aspects, the one or more parameters for the clutter echo detection include an increased transmission power. In some aspects, the increased transmission power may be for one or more of an uplink sounding reference signal, an uplink demodulation reference signal, a physical uplink shared channel, or a physical uplink control channel based on the increased transmission power. In some aspects, the one or more parameters for the clutter echo detection includes one or more timing parameters. The one or more timing parameters may include at least one of an adjusted transmission timing, a guard period on adjacent symbols to symbols measuring self-interference caused by clutter echo, an increased measurement window, or an indication for the first wireless device to measure and report RTT information. In some aspects, the adjusted transmission timing may indicate an offset that may be applied to a timing alignment value sent by the first wireless device to assist with improving the timing alignment. In some aspects, the one or more parameters for the clutter echo detection includes additional resources for the SIM for the clutter echo detection. The additional resources may include one or more of increased beam sweeps for the SIM for the clutter echo detection, a first indication to use an SSB for the SIM for the clutter echo detection, a second indication to use a CSI-RS for the SIM for the clutter echo detection, or a third indication to use a SRS for the SIM for the clutter echo detection. In some aspects, the increased beam sweeps for the SIM for the clutter echo detection may be relative to normal self interference measurements. For example, in order to detect the directivity of the clutter echo, the first wireless device may configure a higher repetition value to sweep more beams or narrower beams to detect the location of the clutter echo. In some aspects, the one or more parameters for the clutter echo detection includes a direction range for the clutter echo detection. The direction range may be indicated based on at least one beam direction within an angle range or an angular offset of a beam. In some aspects, the first wireless device may be a base station and the second wireless device may be a UE. In some aspects, the second wireless device is an IAB node and the first wireless device is a parent IAB node or a child node.

At 1204, the first wireless device may receive a report for one or more beams having a largest self-interference RSRP due to clutter echo. For example, 1204 may be performed by self-interference component 1446 of apparatus 1402. In some aspects, the report may indicate one or more beams having a largest self-interference RSRP due to clutter echo. The one or more beams may be indicated by a CSI-RS ID for each of the one or more beams.

Figure 13:
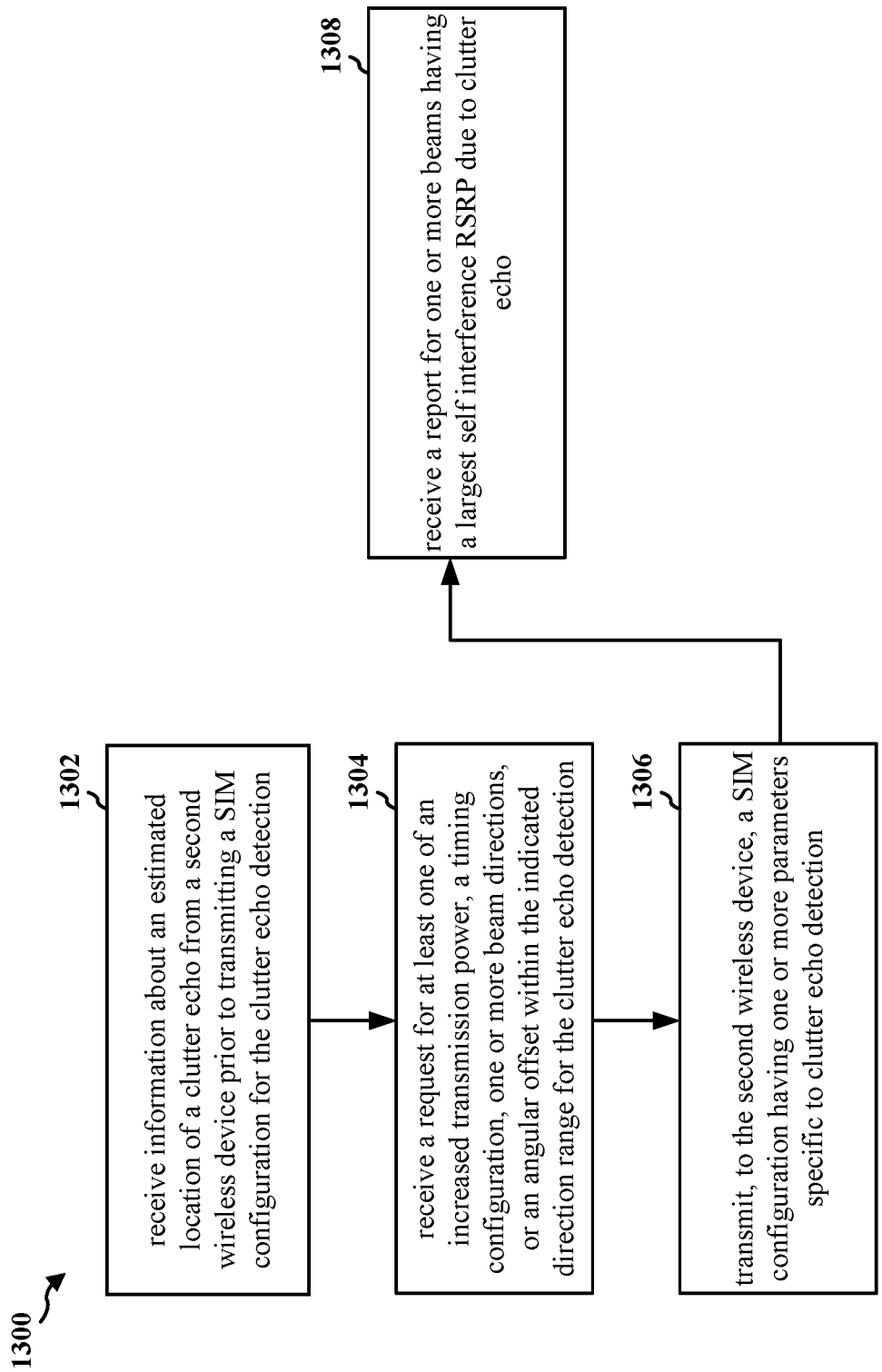
FIG. 13 is a flowchart of a method of wireless communication.

FIG. 13 is a flowchart 1300 of a method of wireless communication at a first wireless device. The method may be performed by an IAB node or a base station or a component of an IAB node or a base station (e.g., the IAB node 103, 410, 420, 510, 520a, 520b; the base station 604, 604-1, 604-2; the device 310, 704, 804; the base station 102, 180; the apparatus 1402; the baseband unit 1404, which may include the memory 376 and which may be the entire device 310 or a component of the device 310, such as the TX processor 316, the RX processor 370, and/or the controller/processor 375). One or more of the illustrated operations may be optional, omitted, transposed, or contemporaneous. The method may enable a first wireless device to detect clutter echo.

At 1302, the first wireless device may receive information about a clutter echo. For example, 1302 may be performed by clutter echo component 1440 of apparatus 1402. The first wireless device may receive information about the clutter echo from a second wireless device. The first wireless device may receive information about the clutter echo from the second wireless device based on a prior measurement. The prior measurement may indicate a clutter echo in an estimated location prior to transmission of the SIM configuration for the clutter echo detection. In some aspects, the information may include reception timing that the second wireless device reports to the first wireless device.

At 1304, the first wireless device may receive a request for configuration parameters. For example, 1304 may be performed by request component 1442 of apparatus 1402. The configuration parameters may include at least one of an increased transmission power, a timing configuration, one or more beam directions, or an angular offset within the indicated direction range for the clutter echo detection.

At 1306, the first wireless device may transmit a SIM configuration. For example, 1306 may be performed by SIM configuration component 1444 of apparatus 1402. The first wireless device may transmit the SIM configuration to a second wireless device. The SIM configuration may have one or more parameters specific to clutter echo detection that are different than for other types of SIM. In some aspects, the one or more parameters for the clutter echo detection include an increased transmission power. In some aspects, the increased transmission power may be for one or more of an uplink sounding reference signal, an uplink demodulation reference signal, a physical uplink shared channel, or a physical uplink control channel based on the increased transmission power. In some aspects, the one or more parameters for the clutter echo detection includes one or more timing parameters. The one or more timing parameters may include at least one of an adjusted transmission timing, a guard period on adjacent symbols to symbols measuring self-interference caused by clutter echo, an increased measurement window, or an indication for the first wireless device to measure and report RTT information. In some aspects, the adjusted transmission timing may indicate an offset that may be applied to a timing alignment value sent by the first wireless device to assist with improving the timing alignment. In some aspects, the one or more parameters for the clutter echo detection includes additional resources for the SIM for the clutter echo detection. The additional resources may include one or more of increased beam sweeps for the SIM for the clutter echo detection, a first indication to use an SSB for the SIM for the clutter echo detection, a second indication to use a CSI-RS for the SIM for the clutter echo detection, or a third indication to use a SRS for the SIM for the clutter echo detection. In some aspects, the increased beam sweeps for the SIM for the clutter echo detection may be relative to normal self interference measurements. For example, in order to detect the directivity of the clutter echo, the first wireless device may configure a higher repetition value to sweep more beams or narrower beams to detect the location of the clutter echo. In some aspects, the one or more parameters for the clutter echo detection includes a direction range for the clutter echo detection. The direction range may be indicated based on at least one beam direction within an angle range or an angular offset of a beam. In some aspects, the first wireless device may be a base station and the second wireless device may be a UE. In some aspects, the second wireless device is an IAB node and the first wireless device is a parent IAB node or a child node.

At 1308, the first wireless device may receive a report for one or more beams having a largest self-interference RSRP due to clutter echo. For example, 1308 may be performed by self-interference component 1446 of apparatus 1402. In some aspects, the report may indicate one or more beams having a largest self-interference RSRP due to clutter echo. The one or more beams may be indicated by a CSI-RS ID for each of the one or more beams.

Figure 14:
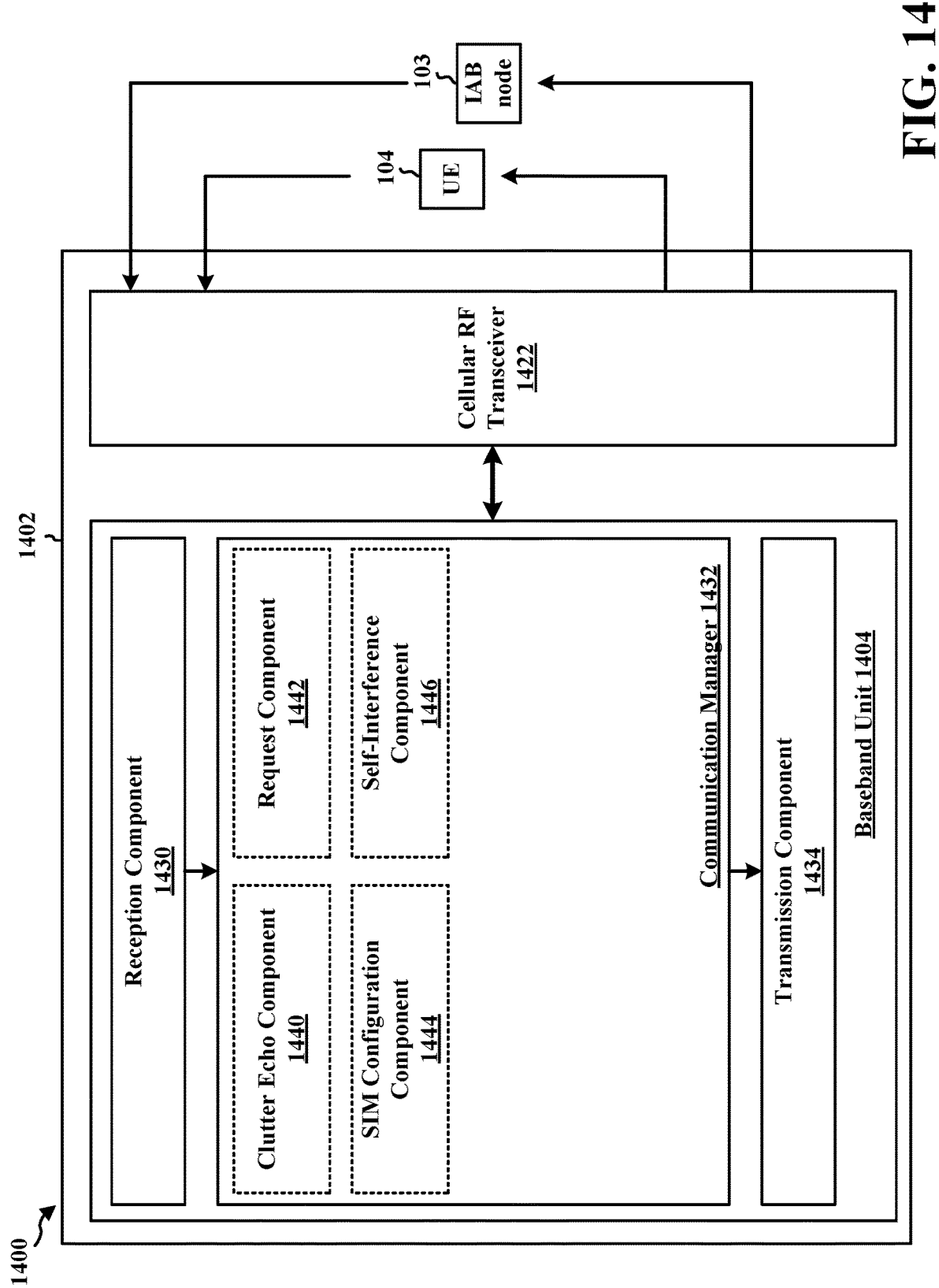
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the device 310 and may include the memory 376 and/or at least one of the TX processor 316, the RX processor 370, and the controller/processor 375.

The communication manager 1432 includes a clutter echo component 1440 that may receive information about a clutter echo from a second wireless device, e.g., as described in connection with 1302 of FIG. 13. The communication manager 1432 further includes a request component 1442 that may receive a request for configuration parameters, e.g., as described in connection with 1304 of FIG. 13. The communication manager 1432 further includes a SIM configuration component 1444 that may transmit a SIM configuration, e.g., as described in connection with 1202 of FIG. 12 or 1306 of FIG. 13. The communication manager 1432 further includes a self-interference component 1446 that may receive a report for one or more beams having a largest self-interference RSRP due to clutter echo, e.g., as described in connection with 1204 of FIG. 12 or 1308 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a second wireless device, a SIM configuration having one or more parameters specific to clutter echo detection that are different than for other types of SIM. The apparatus includes means for receiving a report for one or more beams having a largest self-interference RSRP due to clutter echo. The apparatus further includes means for receiving information about a clutter echo from the second wireless device based on a prior measurement indicating a clutter echo in an estimated location prior to transmitting the SIM configuration for the clutter echo detection. The apparatus further includes means for receiving a request for at least one of an increased transmission power, a timing configuration, one or more beam directions, or an angular offset within the indicated direction range for the clutter echo detection. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 15:
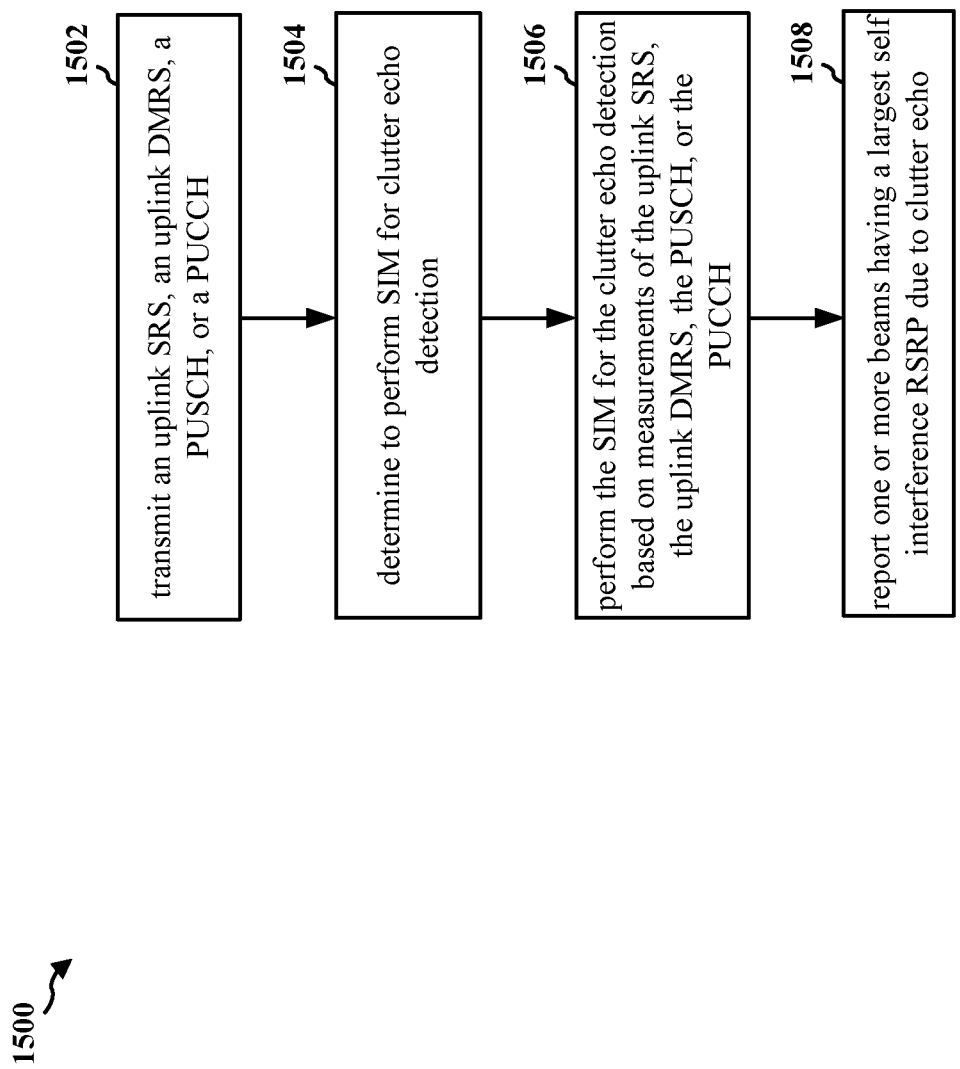
FIG. 15 is a flowchart of a method of wireless communication.

FIG. 15 is a flowchart 1500 of a method of wireless communication at a first wireless device. The method may be performed by an IAB node or a UE or a component of an IAB node or a UE (e.g., the IAB node 103, 410, 420, 510, 520a, 520b; the UE 104, 602, 602-1, 602-2; the device 350, 704, 804; the cellular baseband processor 1704, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to detect clutter echo.

At 1502, the first wireless device may transmit an uplink transmission. For example, 1502 may be performed by uplink component 1740 of apparatus 1702. The first wireless device may transmit the uplink transmission, wherein the uplink transmission may comprise an SRS, an uplink DMRS, a PUSCH, or a PUCCH. In some aspects, the first wireless device may comprise a UE. In some aspects, the first wireless device may comprise an IAB node or a child node At 1504, the first wireless device may determine to perform SIM. For example, 1504 may be performed by detection component 1742 of apparatus 1702. The first wireless device may determine to perform SIM for clutter echo detection. In some aspects, the first wireless device may determine to perform the SIM for the clutter echo detection autonomously. The first wireless device may determine to perform the SIM for the clutter echo detection autonomously without instructions from a second wireless device.

At 1506, the first wireless device may perform the SIM for the clutter echo detection. For example, 1506 may be performed by SIM component 1752 of apparatus 1702. The first wireless device may perform the SIM for the clutter echo detection based on measurements of the uplink SRS, the uplink DMRS, the PUSCH, or the PUCCH. In some aspects, the first wireless device may perform the SIM for the clutter echo detection within a window received in a configuration from a second wireless device. In some aspects, the first wireless device may perform the SIM for the clutter echo detection in a half-duplex mode. In some aspects, the first wireless device may perform the SIM for the clutter echo detection in a full-duplex mode.

At 1508, the first wireless device may report one or more beams having a largest self-interference RSRP due to clutter echo. For example, 1508 may be performed by self-interference component 1756 from apparatus 1702. The first wireless device may report the one or more beams to the second wireless device. In some aspects, the first wireless device may report the one or more beams to the second wireless device in a reporting resource indicated by the second wireless device.

Figure 16:
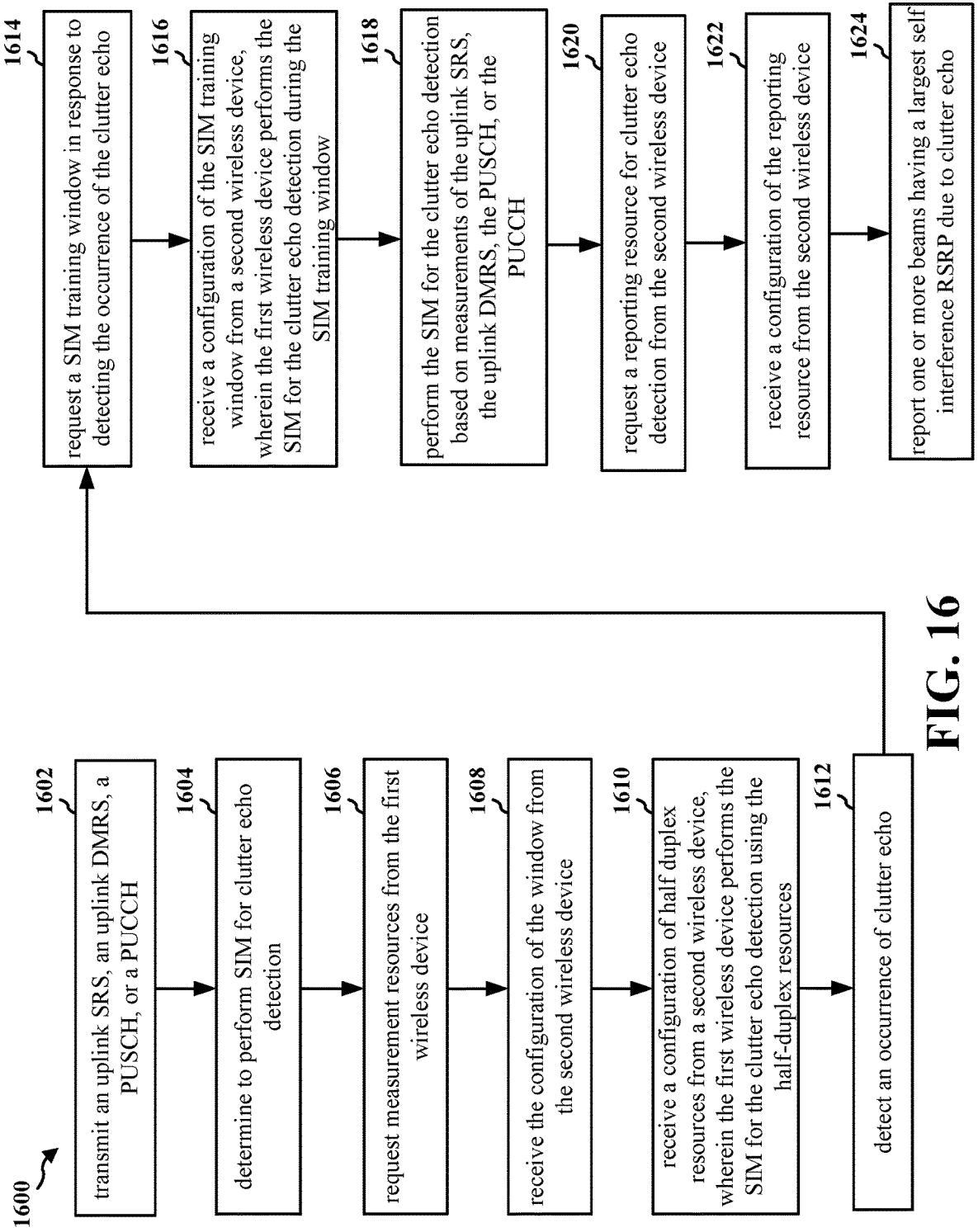
FIG. 16 is a flowchart of a method of wireless communication.

FIG. 16 is a flowchart 1600 of a method of wireless communication at a first wireless device. The method may be performed by an IAB node or a UE or a component of an IAB node or a UE (e.g., the IAB node 103, 410, 420, 510, 520a, 520b; the UE 104, 602, 602-1, 602-2; the device 350, 704, 804; the cellular baseband processor 1704, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to detect clutter echo.

At 1602, the first wireless device may transmit an uplink transmission. For example, 1602 may be performed by uplink component 1740 of apparatus 1702. The first wireless device may transmit the uplink transmission, wherein the uplink transmission may comprise an SRS, an uplink DMRS, a PUSCH, or a PUCCH. In some aspects, the first wireless device may comprise a UE. In some aspects, the first wireless device may comprise an IAB node or a child node.

At 1604, the first wireless device may determine to perform SIM. For example, 1604 may be performed by detection component 1742 of apparatus 1702. The first wireless device may determine to perform SIM for clutter echo detection. In some aspects, the first wireless device may determine to perform the SIM for the clutter echo detection autonomously. The first wireless device may determine to perform the SIM for the clutter echo detection autonomously without instructions from a second wireless device.

At 1606, the first wireless device may request measurement resources. For example, 1606 may be performed by request component 1744 of apparatus 1702. The first wireless device may request the measurement resources from the second wireless device. The first wireless device may request the measurement resources to perform SIM.

At 1608, the first wireless device may receive the configuration of a window for clutter echo detection. For example, 1608 may be performed by window component 1746 of apparatus 1702. The first wireless device may receive the configuration of the window for clutter echo detection from the second wireless device.

At 1610, the first wireless device may receive a configuration of half duplex resources. For example, 1610 may be performed by duplex component 1748 of apparatus 1702. The first wireless device may receive the configuration of the half duplex resources from a second wireless device. The first wireless device may perform the SIM for the clutter echo detection based on the half-duplex resources.

At 1612, the first wireless device may detect an occurrence of clutter echo. For example, 1612 may be performed by event component 1750 of apparatus 1702. In some aspects, the detection of the occurrence of the clutter echo may be based on a configuration for autonomous clutter echo detection of the first wireless device.

At 1614, the first wireless device may request a SIM training window. For example, 1614 may be performed by request component 1744 of apparatus 1702. The first wireless device my request the SIM training window from the second wireless device. The first wireless device may request the SIM training window in response to detection of the occurrence of the clutter echo. The SIM training window may comprise a periodic SRS for transmission beam sweeping.

At 1616, the first wireless device may receive a configuration of the SIM training window. For example, 1616 may be performed by window component 1746 of apparatus 1702. The first wireless device may receive the configuration of the SIM training window from the second wireless device. The first wireless device may perform the SIM for the clutter echo detection during the SIM training window.

At 1618, the first wireless device may perform the SIM for the clutter echo detection. For example, 1618 may be performed by SIM component 1752 of apparatus 1702. The first wireless device may perform the SIM for the clutter echo detection based on measurements of the uplink SRS, the uplink DMRS, the PUSCH, or the PUCCH. In some aspects, the first wireless device may perform the SIM for the clutter echo detection within a window received in a configuration from a second wireless device. In some aspects, the first wireless device may perform the SIM for the clutter echo detection in a half-duplex mode. In some aspects, the first wireless device may perform the SIM for the clutter echo detection in a full-duplex mode.

At 1620, the first wireless device may request a reporting resource for clutter echo detection. For example, 1620 may be performed by request component 1744 of apparatus 1702. The first wireless device may request the reporting resource for clutter echo detection from the second wireless device. The first wireless device may request the reporting resource for clutter echo detection to report the autonomous clutter echo detection.

At 1622, the first wireless device may receive a configuration of the reporting resource. For example, 1622 may be performed by resource component 1754 from apparatus 1702. The first wireless device may receive a configuration of the reporting resource from the second wireless device.

At 1624, the first wireless device may report one or more beams having a largest self-interference RSRP due to clutter echo. For example, 1624 may be performed by self-interference component 1756 from apparatus 1702. The first wireless device may report the one or more beams to the second wireless device. In some aspects, the first wireless device may report the one or more beams to the second wireless device in a reporting resource indicated by the second wireless device.

Figure 17:
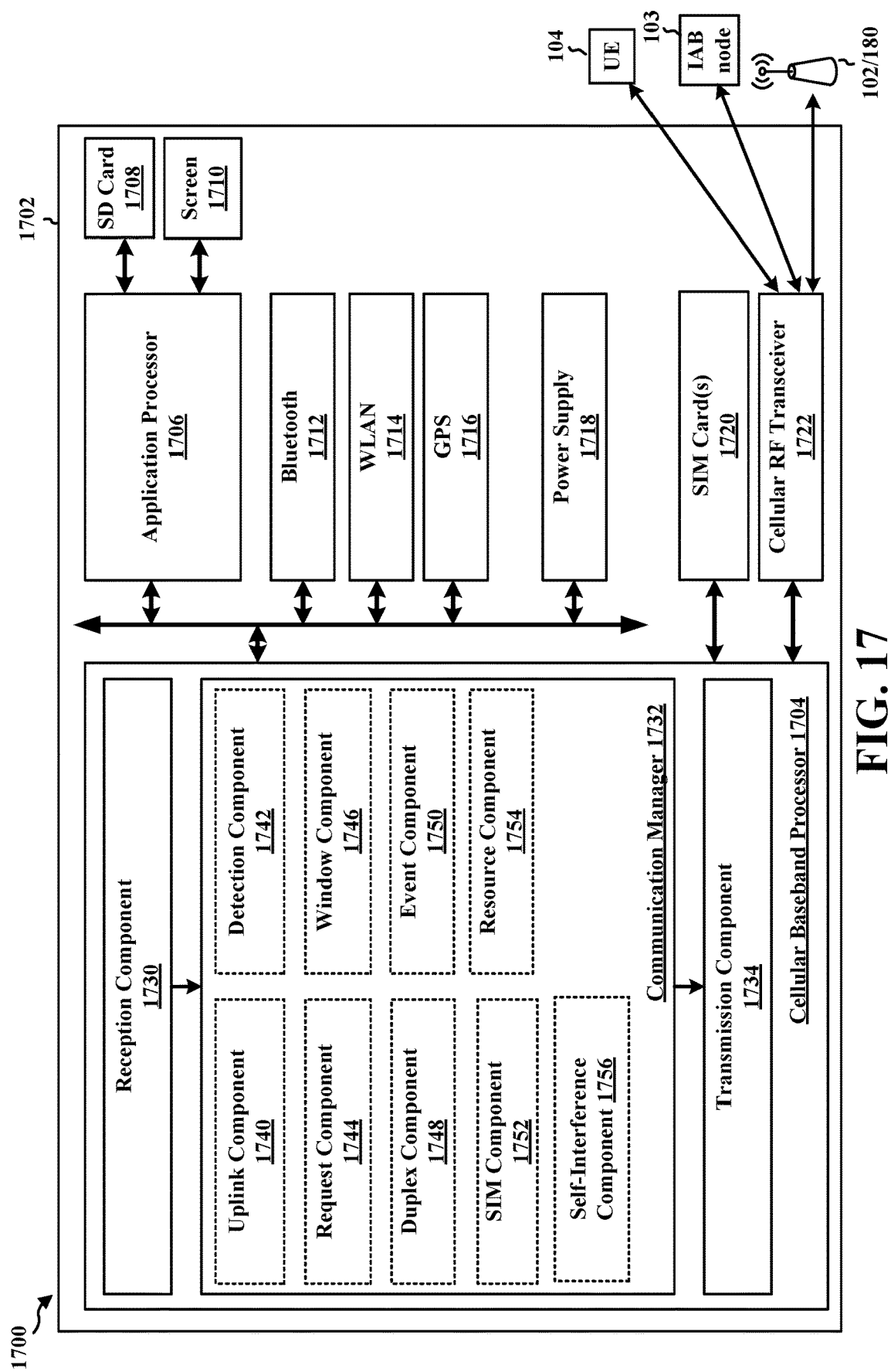
FIG. 17 is a diagram illustrating an example of a hardware implementation for an example apparatus.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes an uplink component 1740 that is configured to transmit an uplink SRS, an uplink DMRS, a PUSCH, or a PUCCH, e.g., as described in connection with 1502 of FIG. 15 or 1602 of FIG. 16. The communication manager 1732 further includes a detection component 1742 that is configured to determine to perform SIM for clutter echo detection, e.g., as described in connection with 1504 of FIG. 15 or 1604 of FIG. 16. The communication manager 1732 further includes a request component 1744 that is configured to request measurement resources, e.g., as described in connection with 1606 of FIG. 16. The communication manager 1732 further includes a window component 1746 that is configured to receive the configuration of the window, e.g., as described in connection with 1608 of FIG. 16. The communication manager 1732 further includes a duplex component 1748 that is configured to receive a configuration of half duplex resources from a second wireless device, e.g., as described in connection with 1610 of FIG. 16. The communication manager 1732 further includes an event component 1750 that is configured to detect an occurrence of clutter echo, e.g., as described in connection with 1612 of FIG. 16. The communication manager 1732 further includes a request component 1744 that is configured to request a SIM training window, e.g., as described in connection with 1614 of FIG. 16. The communication manager 1732 further includes a window component 1746 that is configured to receive a configuration of the SIM training window from a second wireless device, e.g., as described in connection with 1616 of FIG. 16. The communication manager 1732 further includes a SIM component 1752 that is configured to perform the SIM for the clutter echo detection based on measurements of the uplink SRS, the uplink DMRS, the PUSCH, or the PUCCH, e.g., as described in connection with 1506 of FIG. 15 or 1618 of FIG. 16. The communication manager 1732 further includes a request component 1744 that is configured to request the reporting resource for clutter echo detection, e.g., as described in connection with 1620 of FIG. 16. The communication manager 1732 further includes a resource component 1754 that is configured to receive a configuration of the reporting resource, e.g., as described in connection with 1622 of FIG. 16. The communication manager 1732 further includes a self-interference component 1756 that is configured to report one or more beams having a largest self-interference RSRP due to clutter echo, e.g., as described in connection with 1508 of FIG. 15 or 1624 of FIG. 16.

The apparatus may include additional components that perform each of the blocks of the algorithm in the flowcharts of FIG. 15 or 16. As such, each block in the flowcharts of FIG. 15 or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for transmitting an uplink SRS, an uplink DMRS, a PUSCH, or a PUCCH. The apparatus includes means for determining to perform SIM for clutter echo detection. The apparatus includes means for performing the SIM for the clutter echo detection based on measurements of the uplink SRS, the uplink DMRS, the PUSCH, or the PUCCH. The apparatus includes means for reporting one or more beams having a largest self-interference RSRP due to clutter echo. The apparatus further includes means for requesting measurement resources from the first wireless device. The apparatus further includes means for receiving the configuration of the window from the second wireless device. The apparatus further includes means for requesting the reporting resource for clutter echo detection from the second wireless device. The apparatus further includes means for receiving a configuration of the reporting resource from the second wireless device. The apparatus further includes means for receiving a configuration of half duplex resources from a second wireless device, wherein the first wireless device performs the SIM for the clutter echo detection using the half-duplex resources. The apparatus further includes means for detecting an occurrence of clutter echo. The apparatus further includes means for requesting a SIM training window in response to detecting the occurrence of the clutter echo. The apparatus further includes means for receiving a configuration of the SIM training window from a second wireless device, wherein the first wireless device performs the SIM for the clutter echo detection during the SIM training window. The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
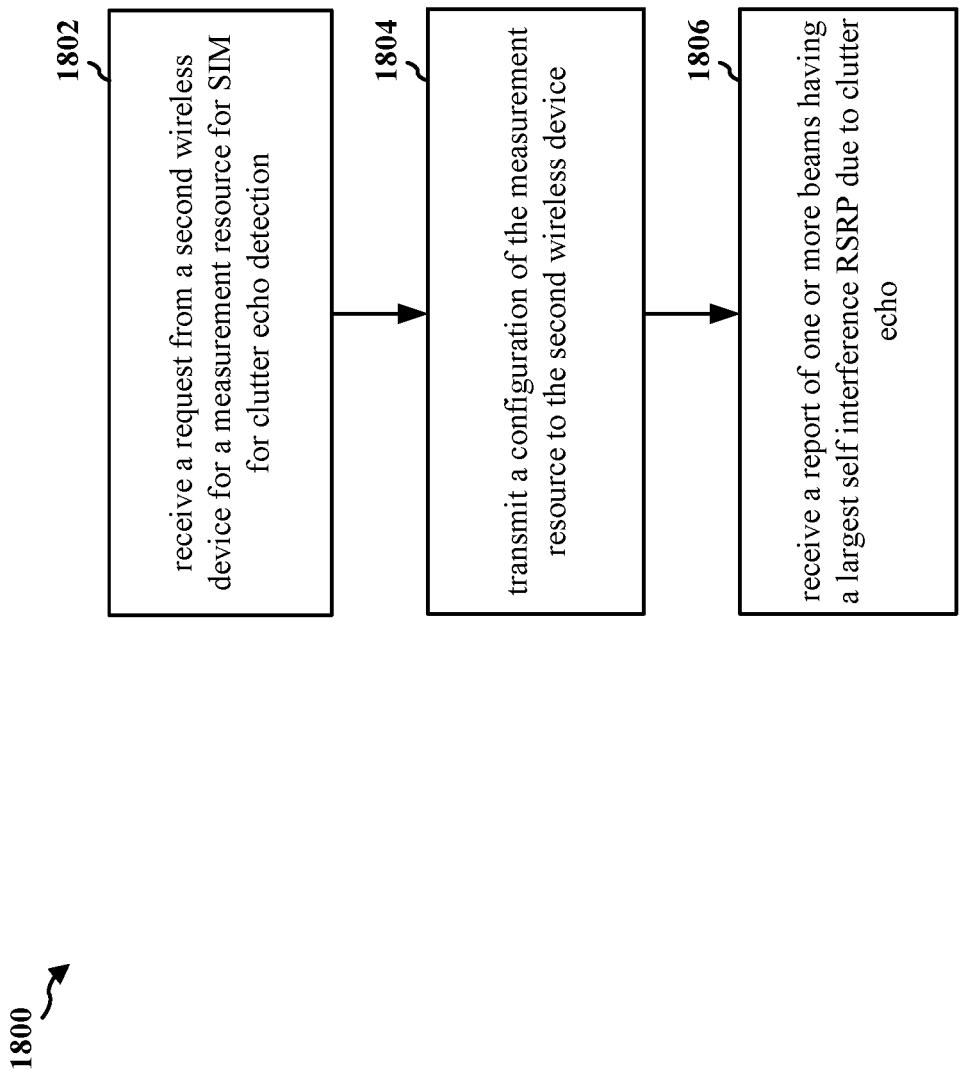
FIG. 18 is a flowchart of a method of wireless communication.

FIG. 18 is a flowchart 1800 of a method of wireless communication of a first wireless device. The method may be performed by an IAB node or a base station or a component of an IAB node or a base station (e.g., the IAB node 103, 410, 420, 510, 520a, 520b; the base station 102, 180, 604, 604-1, 604-2; the device 310, 704, 804; the apparatus 1902; the baseband unit 1904, which may include the memory 376 and which may be the entire device 310 or a component of the device 310, such as the TX processor 316, the RX processor 370, and/or the controller/processor 375). One or more of the illustrated operations may be optional, omitted, transposed, or contemporaneous. The method may enable a first wireless device to detect clutter echo.

At 1802, the first wireless device may receive a request for a measurement resource for SIM for clutter echo detection. For example, 1802 may be performed by request component 1940 of apparatus 1902. The first wireless device may receive the request for the measurement resource for SIM for the clutter echo detection from a second wireless device. In some aspects, the measurement resource may include a SIM window. In some aspects, the measurement resource may include a half duplex resource. In some aspects, the first wireless device may comprise a base station and the second wireless device may comprise a UE. In some aspects, the second wireless device may comprise an IAB node and the first wireless device may comprise a parent IAB node.

At 1804, the first wireless device may transmit a configuration of the measurement resource. For example, 1804 may be performed by configuration component 1942 of apparatus 1902. The first wireless device may transmit the configuration of the measurement resource to the second wireless device. The configuration of the measurement resource may configure the second wireless device to detect clutter echo.

At 1806, the first wireless device may receive a report of one or more beams having a largest self-interference RSRP due to clutter echo. For example, 1806 may be performed by report component 1944 of apparatus 1902. The first wireless device may receive the report of the one or more beams having the largest self-interference RSRP due to clutter echo from the second wireless device. In some aspects, the report may be received in a reporting resource indicated by the first wireless device. In some aspects, the request for the measurement resource may further request the reporting resource for clutter echo detection from the second wireless device. The configuration may further indicate the reporting resource for the second wireless device.

Figure 19:
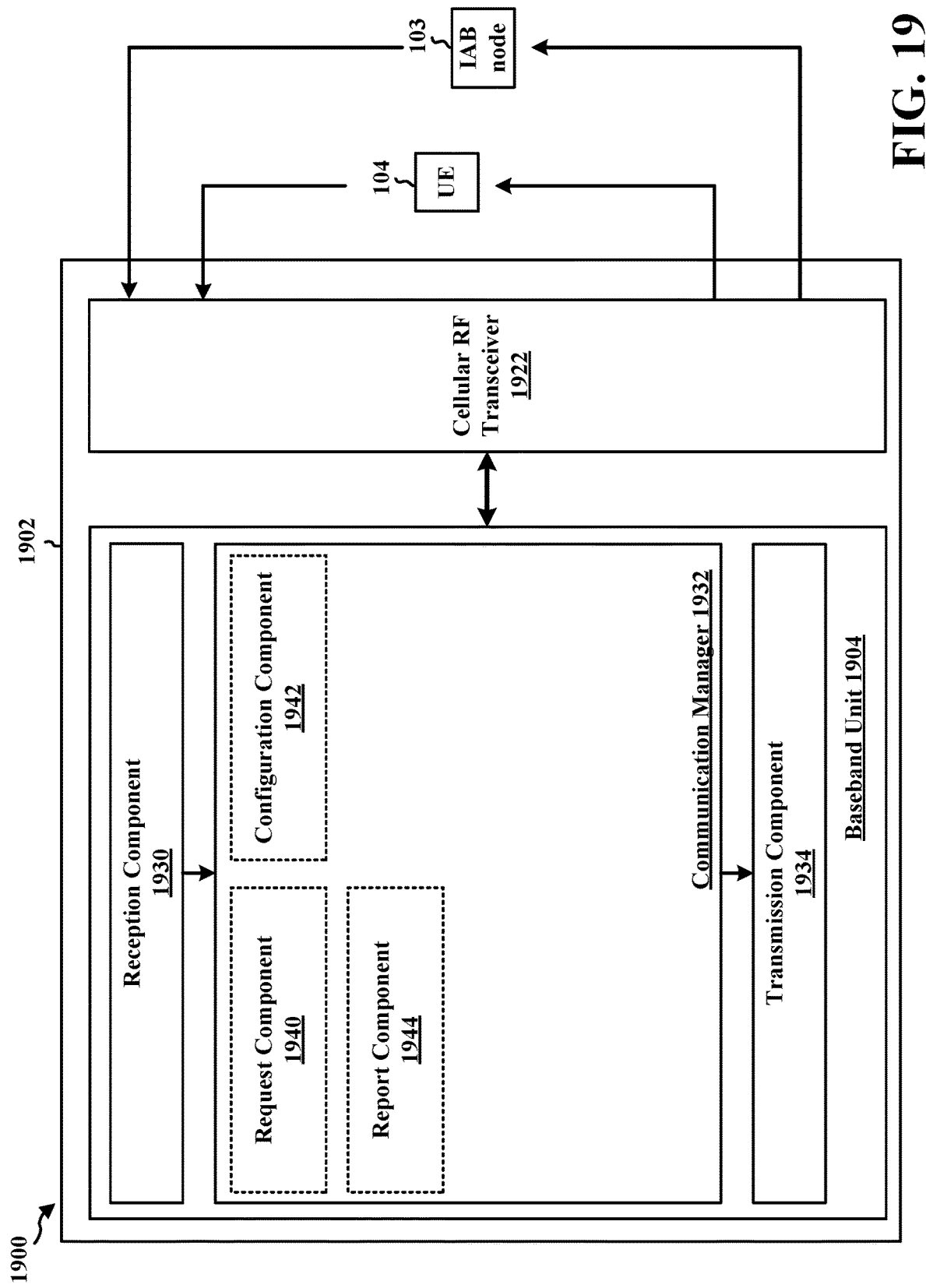
FIG. 19 is a diagram illustrating an example of a hardware implementation for an example apparatus.

FIG. 19 is a diagram 1900 illustrating an example of a hardware implementation for an apparatus 1902. The apparatus 1902 may be a base station, a component of a base station, or may implement base station functionality. In some aspects, the apparatus 1902 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the device 310 and may include the memory 376 and/or at least one of the TX processor 316, the RX processor 370, and the controller/processor 375.

The communication manager 1932 includes a request component 1940 that may receive a request from a second wireless device for a measurement resource for SIM for clutter echo detection, e.g., as described in connection with 1802 of FIG. 18. The communication manager 1932 further includes a configuration component 1942 that may transmit a configuration of the measurement resource, e.g., as described in connection with 1804 of FIG. 18. The communication manager 1932 further includes a report component 1944 that may receive a report of one or more beams having a largest self-interference RSRP due to clutter echo, e.g., as described in connection with 1806 of FIG. 18.

The apparatus may include additional components that perform each of the blocks of the algorithm in the flowchart of FIG. 18. As such, each block in the flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the baseband unit 1904, includes means for receiving a request from a second wireless device for a measurement resource for SIM for clutter echo detection. The apparatus includes means for transmitting a configuration of the measurement resource to the second wireless device. The apparatus includes means for receiving a report of one or more beams having a largest self-interference RSRP due to clutter echo. The means may be one or more of the components of the apparatus 1902 configured to perform the functions recited by the means. As described supra, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including a memory and at least one processor coupled to the memory and configured to receive a SIM configuration having one or more parameters specific to clutter echo detection; perform a SIM for the clutter echo detection based on the SIM configuration; and report one or more beams having a largest self-interference RSRP due to clutter echo.

Aspect 2 is the apparatus of Aspect 1, further includes a transceiver coupled to the at least one processor.

Aspect 3 is the apparatus of Aspects 1 and 2, further includes that the one or more parameters for the clutter echo detection include an increased transmission power, wherein to perform the SIM for the clutter echo detection includes transmission of one or more of an uplink sounding reference signal, an uplink demodulation reference signal, a physical uplink shared channel, or a physical uplink control channel based on the increased transmission power.

Aspect 4 is the apparatus of Aspects 1-3, further includes that the one or more parameters for the clutter echo detection includes one or more timing parameters, wherein the one or more timing parameters includes at least one of an adjusted transmission timing, a guard period on adjacent symbols to symbols measuring self-interference caused by clutter echo, an increased measurement window, or an indication for the first wireless device to measure and report RTT information.

Aspect 5 is the apparatus of Aspects 1-4, further includes that the one or more parameters for the clutter echo detection includes additional resources for the SIM for the clutter echo detection, wherein the additional resources include one or more of increased beam sweeps for the SIM for the clutter echo detection, a first indication to use a SSB for the SIM for the clutter echo detection, a second indication to use a CSI-RS for the SIM for the clutter echo detection, or a third indication to use a SRS for the SIM for the clutter echo detection.

Aspect 6 is the apparatus of Aspects 1-5, further includes that the at least one processor is further configured to report information about a clutter echo in an estimated location, to a second wireless device, based on prior measurements before receiving the SIM configuration having the one or more parameters for the clutter echo detection, wherein the information includes reception timing that the first wireless device reports to the second wireless device.

Aspect 7 is the apparatus of Aspects 1-6, further includes that the at least one processor is further configured to request at least one of an increased transmission power, a timing configuration, one or more beam directions, or an angular offset within an indicated direction range for the clutter echo detection.

Aspect 8 is the apparatus of Aspects 1-7, further includes that the first wireless device performs the SIM for the clutter echo detection in a full duplex mode.

Aspect 9 is the apparatus of Aspects 1-8, further includes that the at least one processor is further configured to receive a configuration of half duplex resources from a second wireless device, wherein the first wireless device performs the SIM for the clutter echo detection using the half duplex resources; detect an occurrence of clutter echo; request a SIM training window in response to detecting the occurrence of the clutter echo; and receive a configuration of the SIM training window from the second wireless device, wherein the first wireless device performs the SIM for the clutter echo detection during the SIM training window.

Aspect 10 is a method of wireless communication for implementing any of Aspects 1-9.

Aspect 11 is an apparatus for wireless communication including means for implementing any of Aspects 1-9.

Aspect 12 is a computer-readable medium storing computer executable code, where the code when executed by a processor causes the processor to implement any of Aspects 1-9.

Aspect 13 is an apparatus for wireless communication at a first wireless device including a memory and at least one processor coupled to the memory and configured to transmit, to a second wireless device, a SIM configuration having one or more parameters specific to clutter echo detection; and receive a report for one or more beams having a largest self-interference RSRP due to clutter echo.

Aspect 14 is the apparatus of Aspect 13, further includes a transceiver coupled to the at least one processor.

Aspect 15 is the apparatus of Aspects 13 and 14, further includes that the one or more parameters for the clutter echo detection include an increased transmission power, wherein the increased transmission power is for one or more of an uplink sounding reference signal, an uplink demodulation reference signal, a physical uplink shared channel, or a physical uplink control channel based on the increased transmission power.

Aspect 16 is the apparatus of Aspects 13-15, further includes that the one or more parameters for the clutter echo detection includes one or more timing parameters, wherein the one or more timing parameters includes at least one of an adjusted transmission timing, a guard period on adjacent symbols to symbols measuring self-interference caused by clutter echo, an increased measurement window, or an indication for the first wireless device to measure and report RTT information.

Aspect 17 is the apparatus of Aspects 13-16, further includes that the one or more parameters for the clutter echo detection includes additional resources for the SIM for the clutter echo detection, wherein the additional resources include one or more of increased beam sweeps for the SIM for the clutter echo detection, a first indication to use a SSB for the SIM for the clutter echo detection, a second indication to use a CSI-RS for the SIM for the clutter echo detection, or a third indication to use a SRS for the SIM for the clutter echo detection.

Aspect 18 is the apparatus of Aspects 13-17, further includes that the at least one processor is further configured to receive information about an estimated location of a clutter echo from the second wireless device prior to transmitting the SIM configuration for the clutter echo detection, wherein the information includes reception timing that the second wireless device reports to the first wireless device; and receive a request for at least one of an increased transmission power, a timing configuration, one or more beam directions, or an angular offset within an indicated direction range for the clutter echo detection.

Aspect 19 is the apparatus of Aspects 13-18, further includes that the report indicates the one or more beams having the largest self-interference RSRP due to clutter echo, wherein the one or more beams are indicated by a CSI-RS ID for each of the one or more beams.

Aspect 20 is a method of wireless communication for implementing any of Aspects 13-19.

Aspect 21 is an apparatus for wireless communication including means for implementing any of Aspects 13-19.

Aspect 22 is a computer-readable medium storing computer executable code, where the code when executed by a processor causes the processor to implement any of Aspects 13-19.

Aspect 23 is an apparatus for wireless communication at a first wireless device including a memory and at least one processor coupled to the memory and configured to transmit an uplink SRS, an uplink DMRS, a PUSCH, or a PUCCH; determine to perform SIM for clutter echo detection; perform the SIM for the clutter echo detection based on measurements of the uplink SRS, the uplink DMRS, the PUSCH, or the PUCCH; and report one or more beams having a largest self-interference RSRP due to clutter echo.

Aspect 24 is the apparatus of Aspect 23, further includes a transceiver coupled to the at least one processor.

Aspect 25 is the apparatus of Aspects 23 and 24, further includes that the first wireless device determines to perform the SIM for the clutter echo detection autonomously without instructions from a second wireless device.

Aspect 26 is the apparatus of Aspects 23-25, further includes that the first wireless device performs the SIM for the clutter echo detection within a window received in a configuration from a second wireless device, wherein the at least one processor is further configured to request measurement resources from the first wireless device; and receive the configuration of the window from the second wireless device.

Aspect 27 is the apparatus of Aspects 23-26, further includes that the first wireless device reports the one or more beams to a second wireless device in a reporting resource indicated by the second wireless device, wherein the at least one processor is further configured to request the reporting resource for the clutter echo detection from the second wireless device; and receive a configuration of the reporting resource from the second wireless device.

Aspect 28 is the apparatus of Aspects 23-27, further includes that the first wireless device performs the SIM for the clutter echo detection in a half duplex mode.

Aspect 29 is the apparatus of Aspects 23-28, further includes that the first wireless device performs the SIM for the clutter echo detection in a full duplex mode.

Aspect 30 is the apparatus of Aspects 23-29, further includes that the at least one processor is further configured to receive a configuration of half duplex resources from a second wireless device, wherein the first wireless device performs the SIM for the clutter echo detection using the half duplex resources.

Aspect 31 is the apparatus of Aspects 23-30, further includes that the at least one processor is further configured to detect an occurrence of clutter echo; request a SIM training window in response to detecting the occurrence of the clutter echo; and receive a configuration of the SIM training window from a second wireless device, wherein the first wireless device performs the SIM for the clutter echo detection during the SIM training window.

Aspect 32 is a method of wireless communication for implementing any of Aspects 23-31.

Aspect 33 is an apparatus for wireless communication including means for implementing any of Aspects 23-31.

Aspect 34 is a computer-readable medium storing computer executable code, where the code when executed by a processor causes the processor to implement any of Aspects 23-31.

Aspect 35 is an apparatus for wireless communication at a first wireless device including a memory and at least one processor coupled to the memory and configured to receive a request from a second wireless device for a measurement resource for SIM for clutter echo detection; transmit a configuration of the measurement resource to the second wireless device; and receive a report of one or more beams having a largest self-interference RSRP due to clutter echo.

Aspect 36 is the apparatus of Aspect 35, further includes a transceiver coupled to the at least one processor.

Aspect 37 is the apparatus of Aspects 35 and 36, further includes that the measurement resource includes a SIM window.

Aspect 38 is the apparatus of Aspects 35-37, further includes that the measurement resource includes a half duplex resource.

Aspect 39 is the apparatus of Aspects 35-38, further includes that the report is received in a reporting resource indicated by the first wireless device, wherein the request further requests the reporting resource for the clutter echo detection from the second wireless device, and wherein the configuration further indicates the reporting resource for the second wireless device.

Aspect 40 is a method of wireless communication for implementing any of Aspects 35-39.

Aspect 41 is an apparatus for wireless communication including means for implementing any of Aspects 35-39.

Aspect 42 is a computer-readable medium storing computer executable code, where the code when executed by a processor causes the processor to implement any of Aspects 35-39.

What is claimed is:

1. An apparatus for wireless communication at a first wireless device, comprising:
a memory; and
at least one processor coupled to the memory and configured to:
report information about a clutter echo in an estimated location, to a second wireless device;
receive a self-interference measurement (SIM) configuration having one or more parameters specific to clutter echo detection;
perform a SIM for the clutter echo detection based on the SIM configuration; and
report one or more beams having a largest self-interference reference signal receive power (RSRP) due to clutter echo:
wherein the reported information about clutter echo in an estimate location is based on prior measurements before receiving the SIM configuration having the one or more parameters for the clutter echo detection, wherein the information includes reception timing that the first wireless device reports to the second wireless device.

2. The apparatus of claim 1, further comprising a transceiver coupled to the at least one processor.

3. The apparatus of claim 1, wherein the one or more parameters for the clutter echo detection include an increased transmission power, wherein to perform the SIM for the clutter echo detection includes transmission of one or more of an uplink sounding reference signal, an uplink demodulation reference signal, a physical uplink shared channel, or a physical uplink control channel based on the increased transmission power.

4. The apparatus of claim 1, wherein the one or more parameters for the clutter echo detection includes one or more timing parameters, wherein the one or more timing parameters includes at least one of:
an adjusted transmission timing,
a guard period on adjacent symbols to symbols measuring self-interference caused by clutter echo,
an increased measurement window, or
an indication for the first wireless device to measure and report round trip timing (RTT) information.

5. The apparatus of claim 1, wherein the one or more parameters for the clutter echo detection includes additional resources for the SIM for the clutter echo detection, wherein the additional resources include one or more of:
increased beam sweeps for the SIM for the clutter echo detection,
a first indication to use a synchronization signal block (SSB) for the SIM for the clutter echo detection,
a second indication to use a channel state information reference signal (CSI-RS) for the SIM for the clutter echo detection, or
a third indication to use a sounding reference signal (SRS) for the SIM for the clutter echo detection.

6. The apparatus of claim 1, wherein the at least one processor is further configured to: request at least one of an increased transmission power, a timing configuration, one or more beam directions, or an angular offset within an indicated direction range for the clutter echo detection.

7. The apparatus of claim 1, wherein the first wireless device performs the SIM for the clutter echo detection in a full duplex mode.

8. The apparatus of claim 7, wherein the at least one processor is further configured to:
receive a configuration of half duplex resources from a second wireless device, wherein the first wireless device performs the SIM for the clutter echo detection using the half duplex resources;
detect an occurrence of clutter echo;
request a SIM training window in response to detecting the occurrence of the clutter echo; and
receive a configuration of the SIM training window from the second wireless device, wherein the first wireless device performs the SIM for the clutter echo detection during the SIM training window.

9. An apparatus for wireless communication at a first wireless device, comprising:
a memory; and
at least one processor coupled to the memory and configured to:
recieve information about an estimated location of a clutter echo from the second wireless device;
transmit, to a second wireless device, a self-interference measurement (SIM) configuration having one or more parameters specific to clutter echo detection; and
receive a report for one or more beams having a largest self-interference reference signal receive power (RSRP) due to clutter echo,
wherein the at least one processor is further configured to:
receive the information about the estimated location of the clutter echo prior to transmitting the SIM configuration for the clutter echo detection, wherein the information includes reception timing that the first wireless device reports to the first wireless device.

10. The apparatus of claim 9, further comprising a transceiver coupled to the at least one processor.

11. The apparatus of claim 9, wherein the one or more parameters for the clutter echo detection include an increased transmission power, wherein the increased transmission power is for one or more of an uplink sounding reference signal, an uplink demodulation reference signal, a physical uplink shared channel, or a physical uplink control channel based on the increased transmission power.

12. The apparatus of claim 9, wherein the one or more parameters for the clutter echo detection includes one or more timing parameters, wherein the one or more timing parameters includes at least one of:
an adjusted transmission timing,
a guard period on adjacent symbols to symbols measuring self-interference caused by clutter echo,
an increased measurement window, or
an indication for the first wireless device to measure and report round trip timing (RTT) information.

13. The apparatus of claim 9, wherein the one or more parameters for the clutter echo detection includes additional resources for the SIM for the clutter echo detection, wherein the additional resources include one or more of:
increased beam sweeps for the SIM for the clutter echo detection,
a first indication to use a synchronization signal block (SSB) for the SIM for the clutter echo detection,
a second indication to use a channel state information reference signal (CSI-RS) for the SIM for the clutter echo detection, or
a third indication to use a sounding reference signal (SRS) for the SIM for the clutter echo detection.

14. The apparatus of claim 9, wherein the at least one processor is further configured to:
receive a request for at least one of an increased transmission power, a timing configuration, one or more beam directions, or an angular offset within an indicated direction range for the clutter echo detection.

15. The apparatus of claim 9, wherein the report indicates the one or more beams having the largest self-interference RSRP due to clutter echo, wherein the one or more beams are indicated by a channel state information reference signal (CSI-RS) identifier (ID) for each of the one or more beams.

16. An apparatus for wireless communication at a first wireless device, comprising:
a memory; and
at least one processor coupled to the memory and configured to:
transmit an uplink sounding reference signal (SRS), an uplink demodulation reference signal (DMRS), a physical uplink shared channel (PUSCH), or a physical uplink control channel (PUCCH);
determine to perform self-interference measurement (SIM) for clutter echo detection;
detect an occurrence of clutter echo;
request a SIM training window in response to detecting the occurrence of the clutter echo, and
receive a configuration of the SIM training window from a second wireless device, wherein the first wireless device performs the SIM for the clutter echo detection during the SIM training window;
perform the SIM for the clutter echo detection based on measurements of the uplink SRS, the uplink DMRS, the PUSCH, or the PUCCH; and
report one or more beams having a largest self-interference reference signal receive power (RSRP) due to clutter echo.

17. The apparatus of claim 16, further comprising a transceiver coupled to the at least one processor.

18. The apparatus of claim 16, wherein the first wireless device determines to perform the SIM for the clutter echo detection autonomously without instructions from a second wireless device.

19. The apparatus of claim 16, wherein the first wireless device performs the SIM for the clutter echo detection within a window received in a configuration from a second wireless device, wherein the at least one processor is further configured to:
request measurement resources from the first wireless device; and
receive the configuration of the window from the second wireless device.

20. The apparatus of claim 16, wherein the first wireless device reports the one or more beams to a second wireless device in a reporting resource indicated by the second wireless device, wherein the at least one processor is further configured to:
request the reporting resource for the clutter echo detection from the second wireless device; and
receive a configuration of the reporting resource from the second wireless device.

21. The apparatus of claim 16, wherein the first wireless device performs the SIM for the clutter echo detection in a half duplex mode.

22. The apparatus of claim 16, wherein the first wireless device performs the SIM for the clutter echo detection in a full duplex mode.

23. The apparatus of claim 22, wherein the at least one processor is further configured to:
receive a configuration of half duplex resources from a second wireless device, wherein the first wireless device performs the SIM for the clutter echo detection using the half duplex resources.

\* \* \* \* \*